US011474877B1

(12) United States Patent
Wada et al.

(10) Patent No.: US 11,474,877 B1
(45) Date of Patent: Oct. 18, 2022

(54) COMPUTER SYSTEM AND SCALE-OUT METHOD OF COMPUTER SYSTEM

(71) Applicant: Hitachi, Ltd., Tokyo (JP)

(72) Inventors: Kiyomi Wada, Tokyo (JP); Shinichi Hayashi, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/675,952

(22) Filed: Feb. 18, 2022

(30) Foreign Application Priority Data

Nov. 9, 2021 (JP) .............................. JP2021-182840

(51) Int. Cl.
*G06F 9/46* (2006.01)
*G06F 9/50* (2006.01)
*H04L 67/1097* (2022.01)

(52) U.S. Cl.
CPC .......... *G06F 9/5083* (2013.01); *G06F 9/5016* (2013.01); *H04L 67/1097* (2013.01)

(58) Field of Classification Search
CPC ............................ G06F 9/5083; G06F 9/5016
See application file for complete search history.

(56) References Cited

U.S. PATENT DOCUMENTS

| 11,394,414 B2* | 7/2022 | Townley ............... H04B 1/1081 |
| 2018/0011913 A1* | 1/2018 | Kapanipathi ......... G06F 16/273 |
| 2019/0265904 A1 | 8/2019 | Nakamura et al. |

FOREIGN PATENT DOCUMENTS

JP          6815342 B2      1/2021

OTHER PUBLICATIONS

Zhang, Shuo ; Liu, Yaping ; Wang, Xiangke ; Yin, Dong; run-Time Dynamic Resource Adjustment for Mitigating Skew in MapReduce; 2021, vol. 126 (2), p. 771-790.*

* cited by examiner

*Primary Examiner* — Camquy Truong
(74) *Attorney, Agent, or Firm* — Procopio, Cory, Hargreaves & Savitch LLP

(57) ABSTRACT

An object of the present invention is to provide a computer system and a scale-out method of the computer system that can reduce the possibility of occurrence of performance deterioration in the case where cloud bursting is executed. In the case where scale-out is executed in a public cloud, a data processing system starts a data copy process of copying data stored in an on-premises first data storage area, to a second data storage area of a storage cluster in the public cloud via a first network. When starting the data copy process, the data processing system executes the scale-out by increasing the number of processing nodes while accessing the data stored in the first data storage area.

10 Claims, 28 Drawing Sheets

F I G. 2
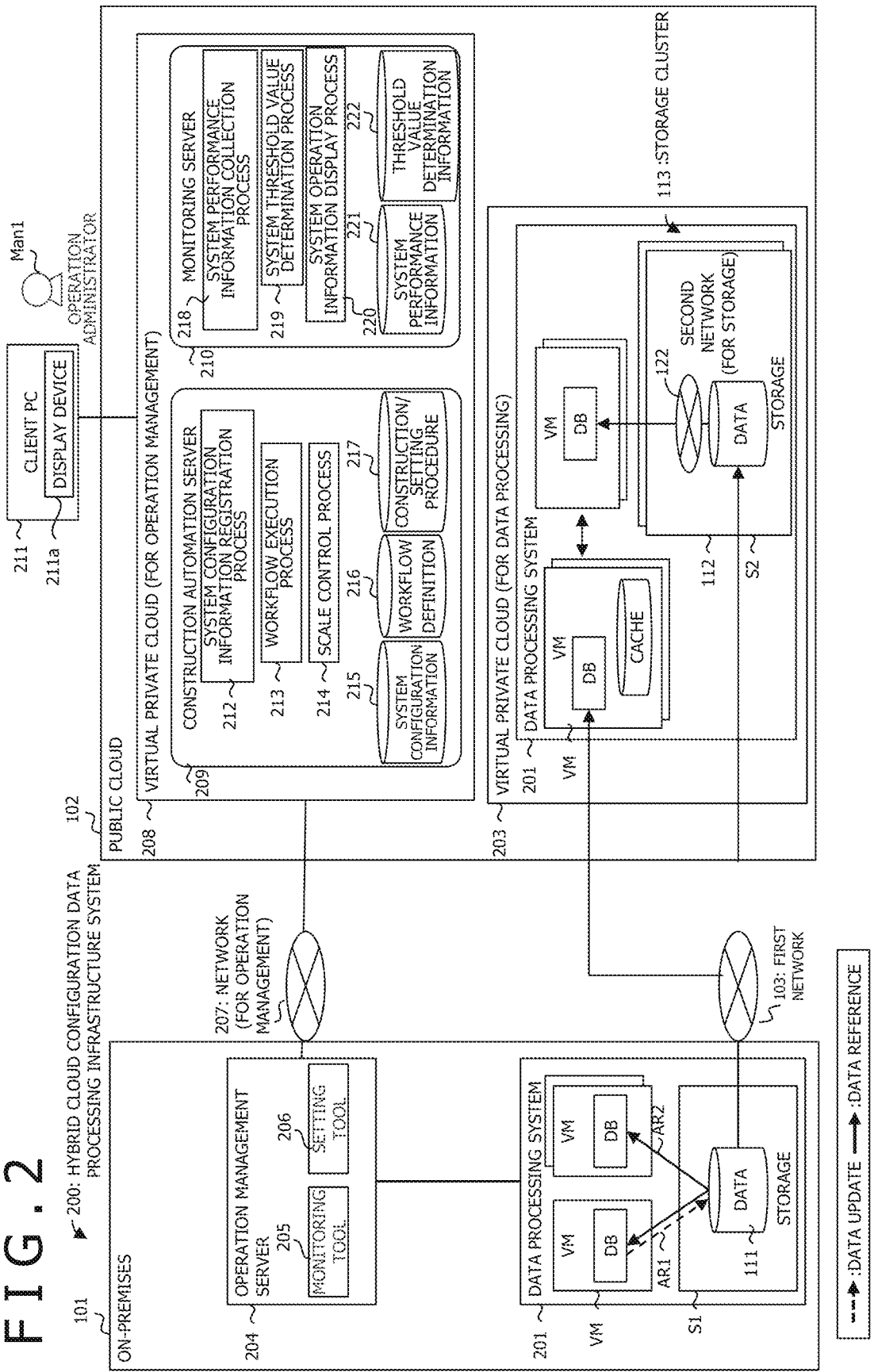

501: SERVER CONFIGURATION INFORMATION TABLE

| PHYSICAL SERVER NAME | DB NODE NAME | IP ADDRESS |
|---|---|---|
| 502 | 503 | 504 |
| SERVER 1 | MasterDB | 10.10.10.10 |
| SERVER 1 | WorkerDB_1 | 10.10.10.11 |
| SERVER 1 | WorkerDB_2 | 10.10.10.12 |
| ... | ... | ... |

505: DB CONFIGURATION INFORMATION TABLE — DB1

| SYSTEM NAME | Master DB NODE NAME | Worker DB CLUSTER NAME |
|---|---|---|
| 506 | 507 | 508 |
| ANALYSIS APPLICATION | MasterDB | Worker DB CLUSTER 1 |
| ... | ... | ... |

509: Worker DB CLUSTER CONFIGURATION INFORMATION TABLE

| Worker DB CLUSTER NAME | LOCATION | PRESENCE OR ABSENCE OF CACHE | NUMBER OF Worker DB NODES | Worker DB NODE NAME | IP ADDRESS |
|---|---|---|---|---|---|
| 510 | 511 | 512 | 513 | 514 | 515 |
| Worker DB CLUSTER 1 | PUBLIC CLOUD | ABSENT | 2 | WorkerDB_1 | 10.10.10.11 |
| Worker DB CLUSTER 1 | PUBLIC CLOUD | ABSENT | 2 | WorkerDB_2 | 10.10.10.12 |
| ... | ... | ... | ... | ... | ... |

516: RELEVANT INFORMATION TABLE REGARDING DB AND VOLUME

| SYSTEM NAME | DB NODE NAME | IP ADDRESS | VOLUME NAME | CAPACITY (TB) | PORT NAME | PATH NAME |
|---|---|---|---|---|---|---|
| 517 | 518 | 519 | 520 | 521 | 522 | 523 |
| ANALYSIS APPLICATION | MasterDB | 10.10.10.10 | 00:00:01 | 100 | PORT_1A | PATH_02 |
| ANALYSIS APPLICATION | MasterDB | 10.10.10.10 | 00:00:02 | 100 | PORT_2A | PATH_02 |
| ANALYSIS APPLICATION | MasterDB | 10.10.10.10 | 00:00:03 | 100 | PORT_1A | PATH_03 |
| ANALYSIS APPLICATION | WorkerDB_1 | 10.10.10.11 | 00:00:01 | 100 | PORT_1A | PATH_03 |
| ANALYSIS APPLICATION | WorkerDB_1 | 10.10.10.11 | 00:00:02 | 100 | PORT_2A | PATH_03 |
| ANALYSIS APPLICATION | WorkerDB_1 | 10.10.10.11 | 00:00:03 | 100 | PORT_1A | PATH_04 |
| ... | ... | ... | ... | ... | ... | ... |

FIG. 5B

524: STORAGE CLUSTER CONFIGURATION INFORMATION TABLE

| STORAGE CLUSTER NAME | NUMBER OF NODES | STORAGE NODE NAME | IP ADDRESS | VOLUME NAME | CAPACITY (TB) | PORT NAME | PATH NAME |
|---|---|---|---|---|---|---|---|
| STORAGE CLUSTER 1 | 3 | STORAGE NODE 1 | 10.10.10.21 | 00:01:01 | 100 | PORT_1A | PATH_03 |
| STORAGE CLUSTER 1 | 3 | STORAGE NODE 1 | 10.10.10.21 | 00:01:03 | 100 | PORT_1A | PATH_04 |
| STORAGE CLUSTER 1 | 3 | STORAGE NODE 2 | 10.10.10.22 | 00:01:02 | 100 | PORT_2A | PATH_02 |
| STORAGE CLUSTER 1 | 3 | STORAGE NODE 3 | 10.10.10.23 | 00:01:05 | ... | PORT_3A | PATH_02 |
| ... | ... | ... | ... | ... | ... | ... | ... |

533: REMOTE COPY CONFIGURATION INFORMATION TABLE

| COPY SOURCE STORAGE NAME | COPY SOURCE VOLUME NAME | CAPACITY (TB) | COPY SOURCE PORT NAME | COPY DESTINATION STORAGE CLUSTER NAME | COPY DESTINATION VOLUME NAME | COPY DESTINATION PORT NAME | COPY DESTINATION PATH NAME |
|---|---|---|---|---|---|---|---|
| STORAGE 1 | 00:00:01 | 100 | PORT_1A | STORAGE CLUSTER 1 | 00:01:01 | PORT_1A | PATH_01 |
| STORAGE 1 | 00:00:02 | 100 | PORT_2A | STORAGE CLUSTER 1 | 00:01:02 | PORT_2A | PATH_01 |
| STORAGE 1 | 00:00:03 | 100 | PORT_1A | STORAGE CLUSTER 1 | 00:01:03 | PORT_1A | PATH_02 |
| ... | ... | ... | ... | ... | ... | ... | ... |

542: LOCAL COPY CONFIGURATION INFORMATION TABLE

| COPY SOURCE VOLUME NAME | CAPACITY (TB) | COPY SOURCE PORT NAME | COPY DESTINATION VOLUME NAME | COPY DESTINATION PORT NAME | COPY DESTINATION PATH NAME |
|---|---|---|---|---|---|
| 00:01:03 | 100 | PORT_1A | 00:01:05 | PORT_3A | PATH_01 |

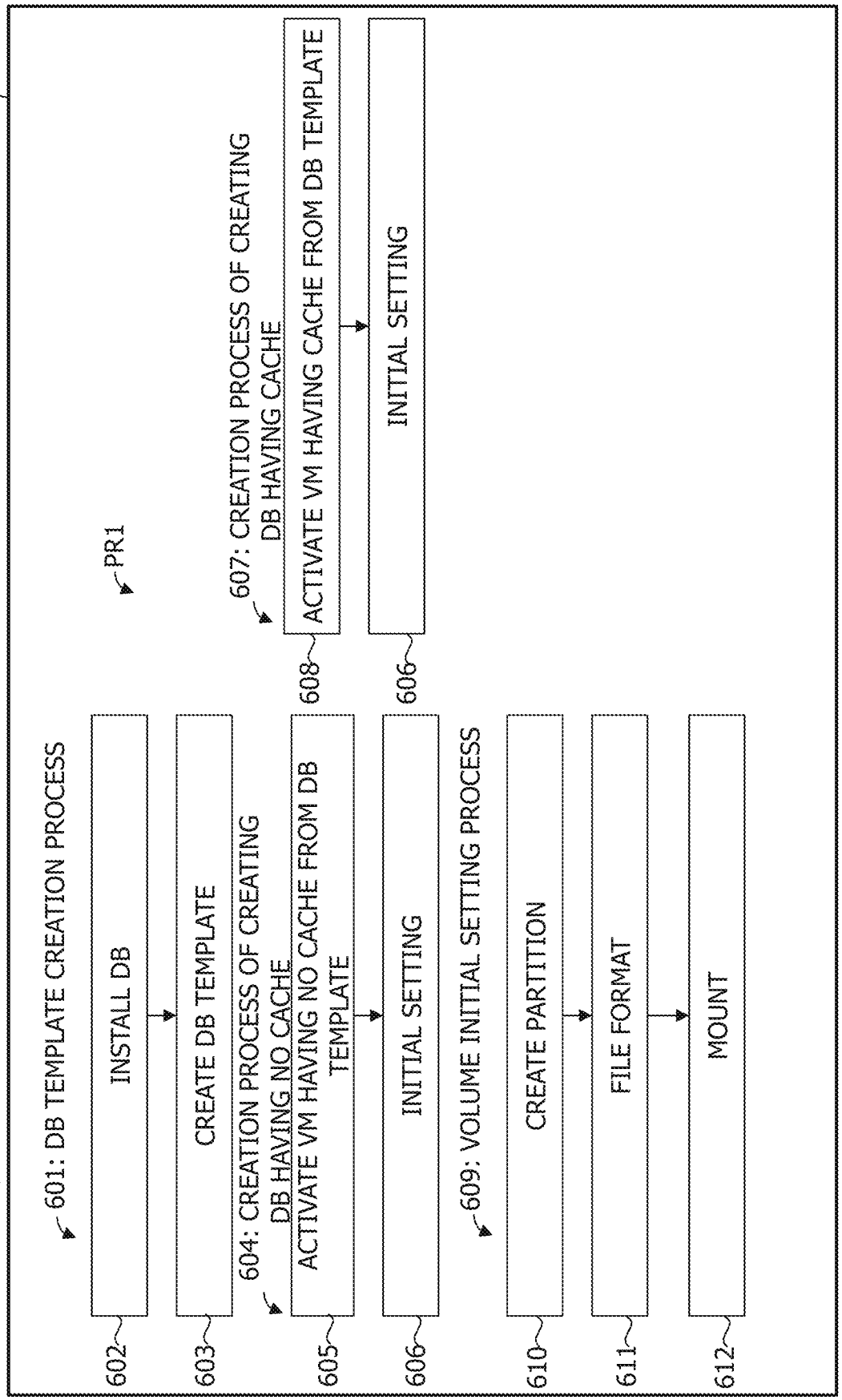

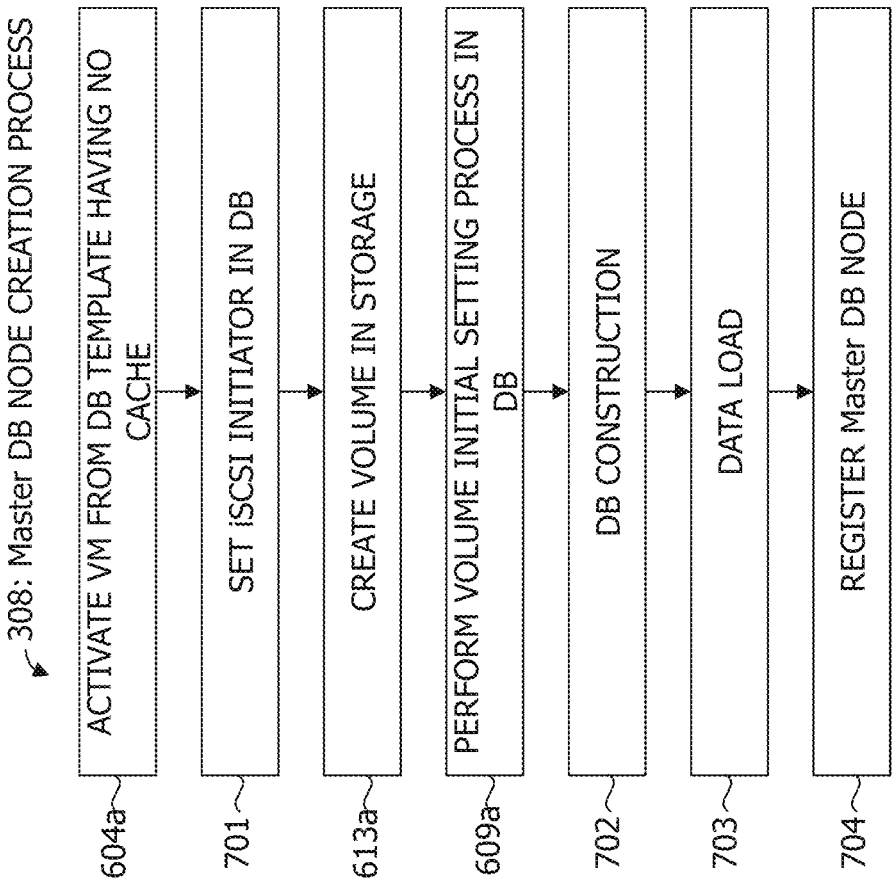

FIG. 8A

801: PHYSICAL SERVER PERFORMANCE INFORMATION TABLE

| DATE AND TIME | PHYSICAL SERVER NAME | CPU UTILIZATION RATE (%) | NETWORK TRANSFER AMOUNT (GB/MINUTE) |
|---|---|---|---|
| 2021/08/18_10:00 | SERVER 1 | 95 | 20 |
| 2021/08/18_10:01 | SERVER 1 | 95 | 20 |
| ... | | | : |

806: PERFORMANCE INFORMATION TABLE INDICATING PERFORMANCE BY DB NODE

| DATE AND TIME | DB NODE NAME | IP ADDRESS | CPU UTILIZATION RATE (%) | NETWORK TRANSFER AMOUNT (GB/MINUTE) |
|---|---|---|---|---|
| 2021/08/18_10:00 | WorkerDB_1 | 10.10.10.1 | 95 | 20 |
| 2021/08/18_10:01 | WorkerDB_1 | 10.10.10.1 | 95 | 20 |
| ... | | | : | : |

812: Worker DB CLUSTER PERFORMANCE INFORMATION TABLE

| DATE AND TIME | Worker DB CLUSTER NAME | CPU UTILIZATION RATE (%) | NETWORK TRANSFER AMOUNT (GB/MINUTE) |
|---|---|---|---|
| 2021/08/18_10:00 | Worker DB CLUSTER 1 | 95 | 20 |
| 2021/08/18_10:01 | Worker DB CLUSTER 1 | 95 | 20 |
| ... | | | : |

FIG. 8B

817: PERFORMANCE INFORMATION TABLE INDICATING PERFORMANCE BY STORAGE NODE

| DATE AND TIME | STORAGE NODE NAME | IP ADDRESS | CPU UTILIZATION RATE (%) | NETWORK TRANSFER AMOUNT (GB/MINUTE) | STORAGE TRANSFER AMOUNT (GB/MINUTE) |
|---|---|---|---|---|---|
| 2021/08/18_10:00 | STORAGE NODE 1 | 10.10.10.1 | 95 | 180 | 120 |
| 2021/08/18_10:01 | STORAGE NODE 1 | 10.10.10.1 | 95 | 180 | 120 |
| : | : | : | : | : | : |

824: STORAGE CLUSTER PERFORMANCE INFORMATION TABLE

| DATE AND TIME | STORAGE CLUSTER NAME | CPU UTILIZATION RATE (%) | NETWORK TRANSFER AMOUNT (GB/MINUTE) | STORAGE TRANSFER AMOUNT (GB/MINUTE) |
|---|---|---|---|---|
| 2021/08/18_10:00 | STORAGE CLUSTER 1 | 95 | 180 | 120 |
| 2021/08/18_10:01 | STORAGE CLUSTER 1 | 95 | 180 | 120 |
| : | : | : | : | : |

FIG. 9

901: Worker DB CLUSTER THRESHOLD VALUE INFORMATION TABLE

| Worker DB CLUSTER NAME | CPU UTILIZATION RATE (%) | NETWORK TRANSFER AMOUNT (GB/MINUTE) | STORAGE TRANSFER AMOUNT (GB/MINUTE) |
|---|---|---|---|
| Worker DB CLUSTER 1 | 90 | | |
| Worker DB CLUSTER 2 | 90 | 25 | 120 |
| Worker DB CLUSTER 3 | 90 | | |
| : | : | : | : |

906: STORAGE CLUSTER THRESHOLD VALUE INFORMATION TABLE

| STORAGE CLUSTER NAME | NUMBER OF STORAGE NODES | CPU UTILIZATION RATE (%) | NETWORK TRANSFER AMOUNT (GB/MINUTE) | STORAGE TRANSFER AMOUNT (GB/MINUTE) |
|---|---|---|---|---|
| STORAGE CLUSTER 1 | 3 | 90 | 180 | 120 |
| STORAGE CLUSTER 2 | 5 | 90 | 300 | 200 |
| : | : | : | : | : |

912: ALERT OCCURRENCE CONDITION TABLE

| METRICS NAME | PERIOD | NUMBER OF TIMES |
|---|---|---|
| CPU UTILIZATION RATE | 5 MINUTES | 3 TIMES |
| : | : | : |

916: ALERT OCCURRENCE INFORMATION TABLE

| DATE AND TIME | ALERT NAME | OCCURRENCE LOCATION |
|---|---|---|
| 2021/08/18_10:00 | EXCESS OF CPU UTILIZATION RATE | Worker DB CLUSTER 1 |
| : | : | : |

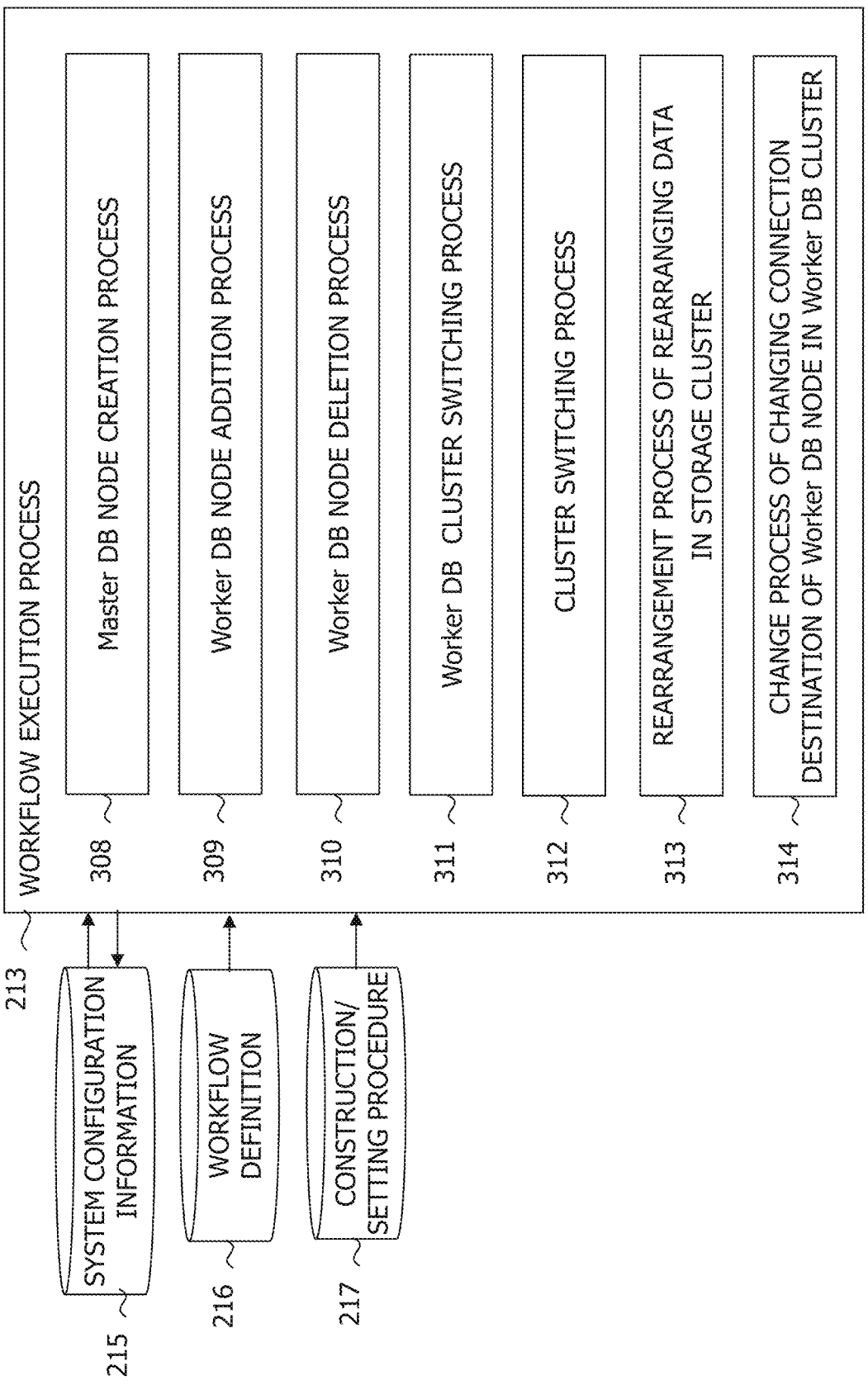

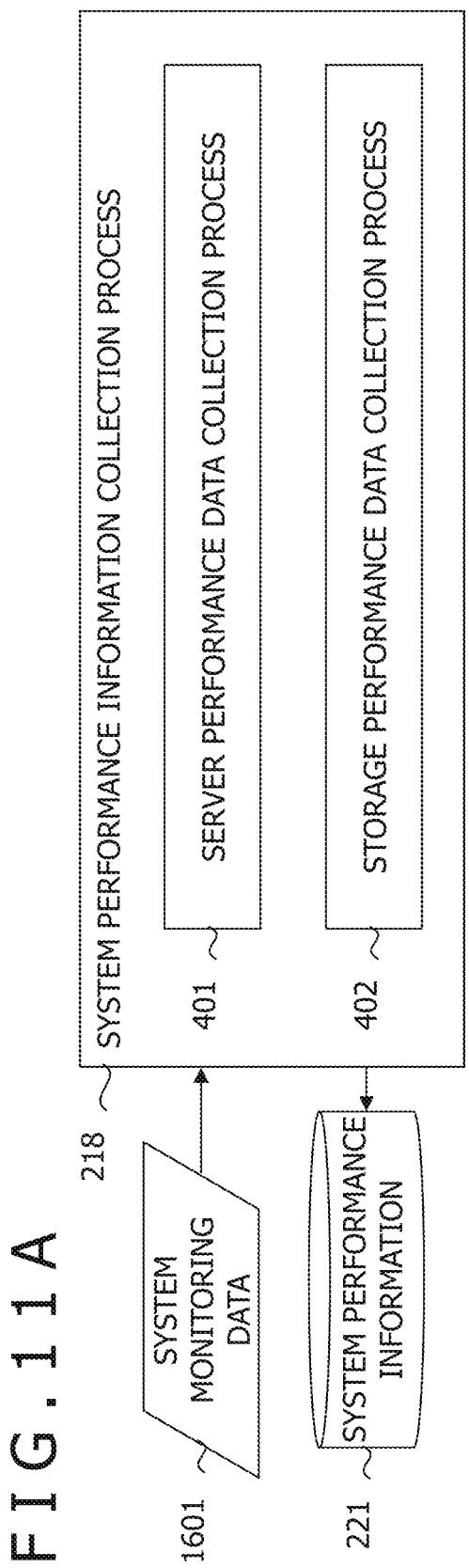

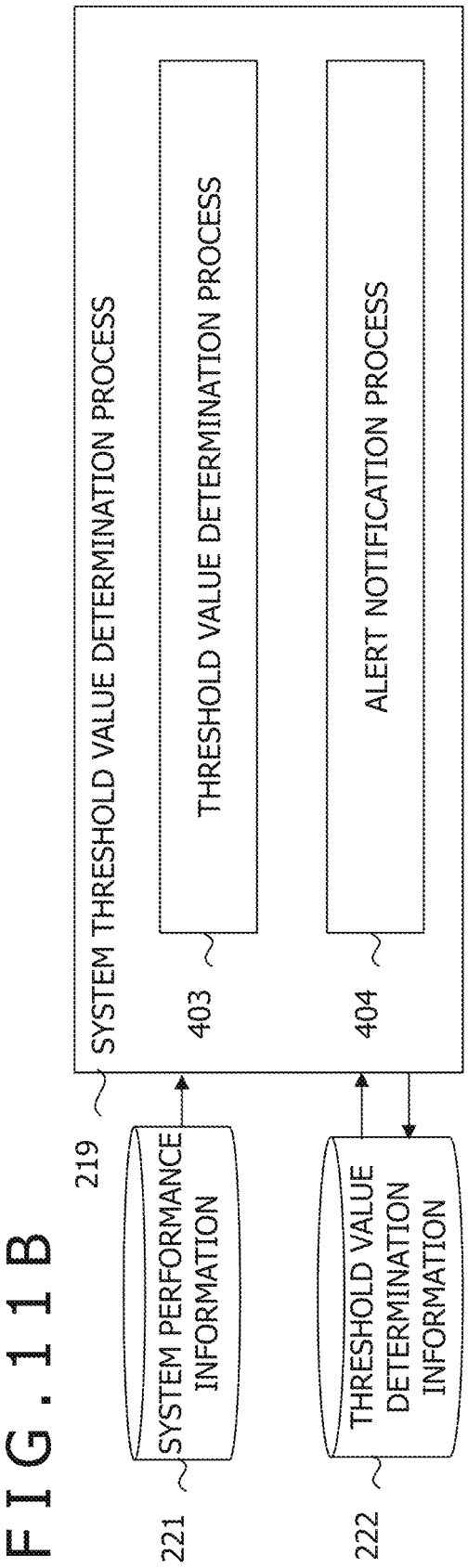

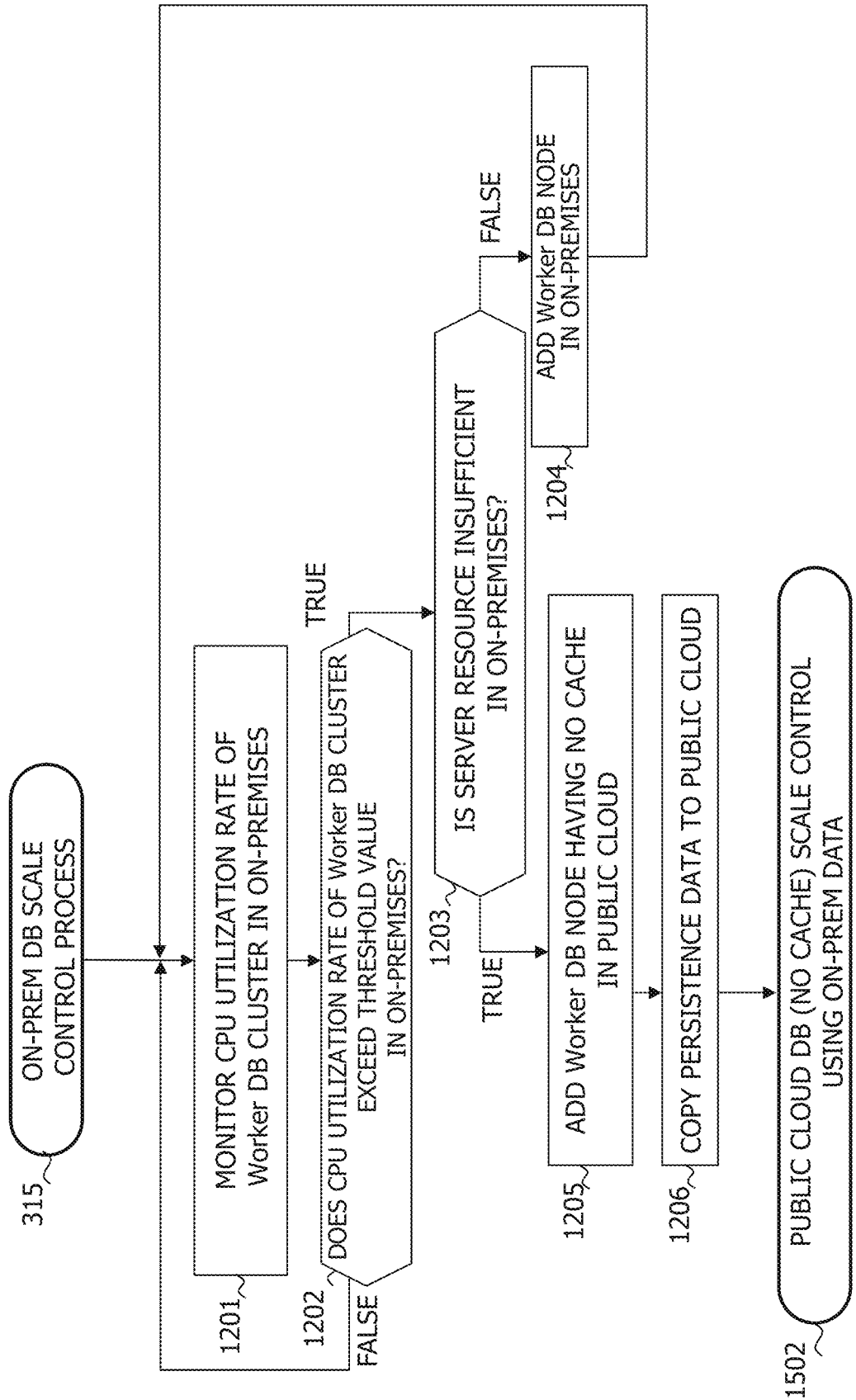

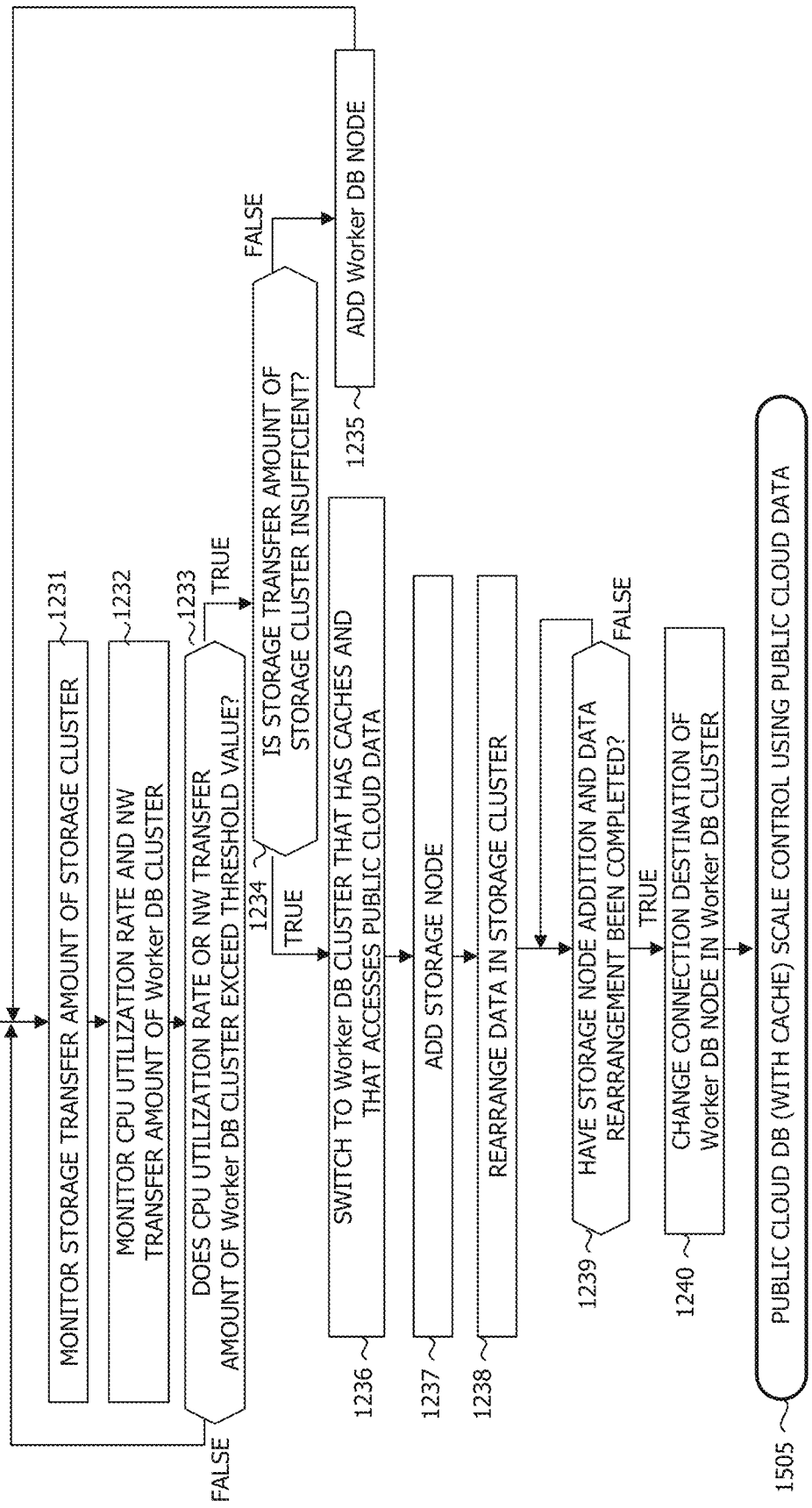

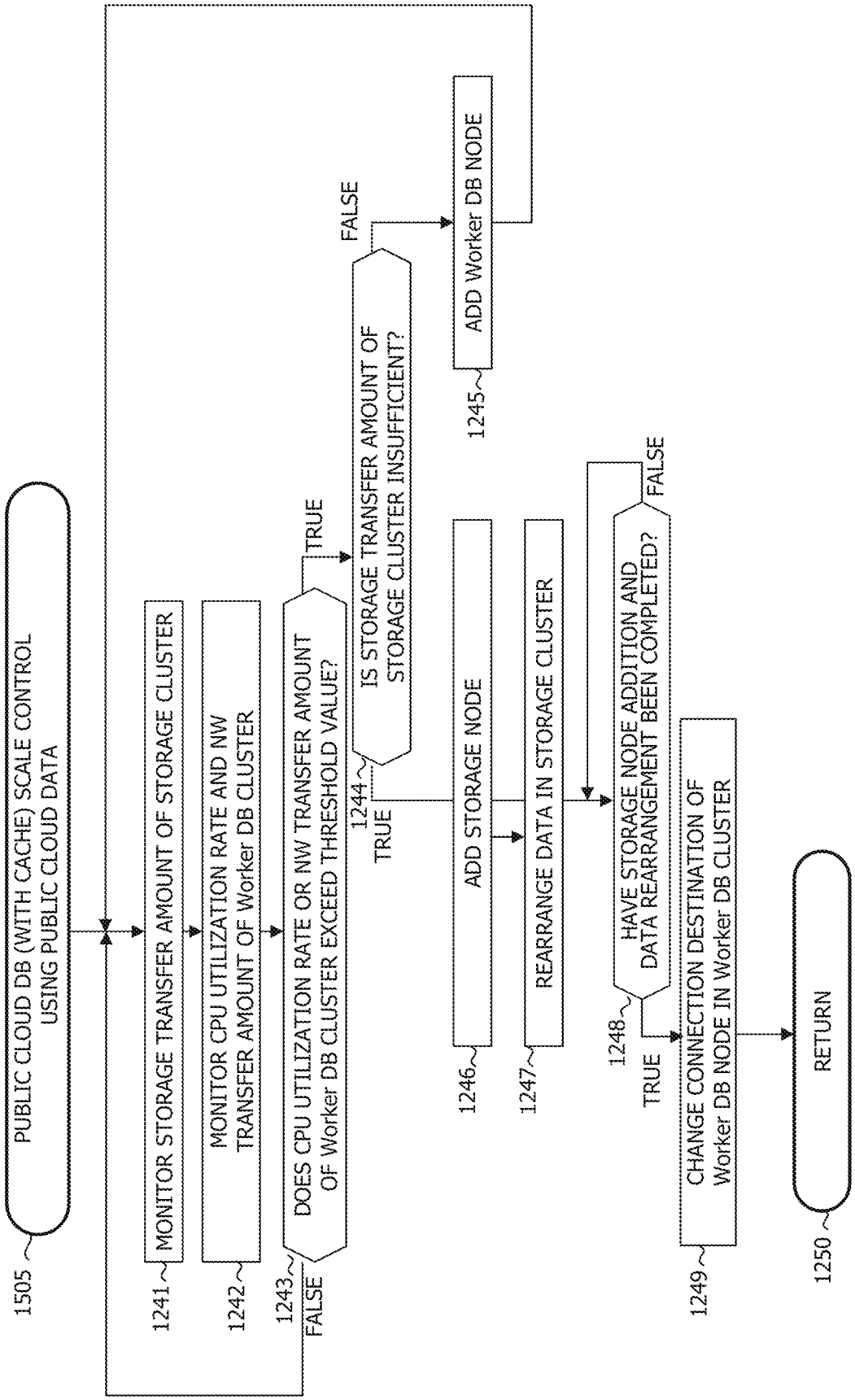

COMPUTER SYSTEM AND SCALE-OUT METHOD OF COMPUTER SYSTEM

BACKGROUND OF THE INVENTION

1. Field of the Invention

The present invention relates to a computer system and a scale-out method of the computer system.

2. Description of the Related Art

In a data processing infrastructure for executing stationary data analysis by a data processing system built in an on-premises environment, the data processing infrastructure may temporarily become overloaded when an unexpected analysis request is made, and analysis time may become long. In this case, if cloud bursting is executed, it is possible to eliminate the need to secure resources in the on-premises environment according to an unexpected load.

The cloud bursting scales out a public cloud (adds (increases) the number of computers (computer resources) that execute data processing). In the cloud bursting, data necessary for data processing needs to be copied from the on-premises environment to the public cloud. However, since there is a limit on the communication bandwidth between the data processing system built in the on-premises environment and the public cloud, it takes time to copy data. Therefore, it may be difficult to cope with an unexpected load in some cases.

To deal with this problem, a computer system disclosed in Japanese Patent No. 6815342 (hereinafter, referred to as an "existing system") copies a part of data from a computer system built in an on-premises environment to a public cloud in cloud bursting. Accordingly, the existing system reduces the time required to copy data and the amount of data to be copied. The existing system determines a part of data to be copied, on the basis of an access history or the like.

SUMMARY OF THE INVENTION

However, in the case where the amount of a part of data to be copied is large in cloud bursting, the copy waiting time until the data copy is completed becomes long in the existing system. Therefore, there is a possibility that the performance is deteriorated due to the copy waiting time in the existing system. As a result, it may be difficult for the existing system to cope with an unexpected load.

The present invention has been made in order to solve the above-described problems. That is, one of the objects of the present invention is to provide a computer system and a scale-out method of the computer system that can reduce the possibility of occurrence of performance deterioration in the case where cloud bursting is executed.

In order to solve the above-described problems, the present invention provides a computer system including a data processing system that is built in a specific environment. The data processing system includes a management node that accepts data processing, a processing cluster that includes a plurality of processing nodes configured to perform, in a distributed manner, the data processing accepted by the management node, and a storage that includes a first data storage area in which data necessary for the data processing is stored. The data processing system is configured to be capable of executing scaling for increasing or decreasing the number of the processing nodes that are resources for executing the data processing in a distributed manner, according to the load of the processing cluster. In the case where the resources of the data processing system become insufficient due to an increase in the load of the processing cluster, the data processing system includes the processing nodes the number of which can be increased or decreased and a storage cluster having a plurality of storage nodes the number of which can be increased or decreased, the data processing system being configured to be capable of executing scale-out for increasing the number of the processing nodes that are the resources for executing the data processing in a distributed manner, in a cloud environment different from the specific environment that can communicate with the data processing system via a network. In the case where the scale-out is executed in the cloud environment, the data processing system starts a data copy process of copying data that is stored in the first data storage area and that is to be used in the data processing, from the first data storage area of the data processing system to a second data storage area of the storage cluster via the network, and executes, during a period of time from a start of the data copy process to an end of the data copy process, the scale-out in the cloud environment by increasing the number of the processing nodes that execute the data processing in a distributed manner while accessing the data stored in the first data storage area of the storage via the network.

In addition, the present invention provides a scale-out method of a computer system that is executed by a data processing system built in a specific environment. The data processing system includes a management node that accepts data processing, a processing cluster that includes a plurality of processing nodes configured to perform, in a distributed manner, the data processing accepted by the management node, and a storage that includes a first data storage area in which data necessary for the data processing is stored. The data processing system is configured to be capable of executing scaling for increasing or decreasing the number of the processing nodes that are resources for executing the data processing in a distributed manner, according to the load of the processing cluster. In the case where the resources of the data processing system become insufficient due to an increase in the load of the processing cluster, the data processing system includes the processing nodes the number of which can be increased or decreased and a storage cluster having a plurality of storage nodes the number of which can be increased or decreased, and executes scale-out for increasing the number of the processing nodes that are the resources for executing the data processing in a distributed manner, in a cloud environment different from the specific environment that can communicate with the data processing system via a network. In the case where the scale-out is executed in the cloud environment, the data processing system starts a data copy process of copying data that is stored in the first data storage area and that is to be used in the data processing, from the first data storage area of the data processing system to a second data storage area of the storage cluster via the network, and executes, during a period of time from a start of the data copy process to an end of the data copy process, the scale-out in the cloud environment by increasing the number of the processing nodes that execute the data processing in a distributed manner while accessing the data stored in the first data storage area of the storage via the network.

According to the present invention, it is possible to reduce the possibility of occurrence of performance deterioration in the case where cloud bursting is executed.

BRIEF DESCRIPTION OF THE DRAWINGS

FIG. 2 is a schematic configuration diagram showing a system configuration example of a data processing infrastructure system;

FIG. 5A is a diagram for explaining details of database (DB) information included in system configuration information;

FIG. 5B is a diagram for explaining details of storage information included in the system configuration information;

FIG. 6A is a diagram for explaining a DB server construction/setting procedure included in a construction/setting procedure;

FIG. 7A is a diagram for explaining a Master DB node creation process;

FIG. 8A is a diagram for explaining DB performance information;

FIG. 8B is a diagram for explaining storage performance information included in system performance information;

FIG. 9 is a diagram for explaining each piece of information included in threshold value determination information;

FIG. 10B is a diagram for explaining a workflow execution process;

FIG. 11A is a diagram for explaining a system performance information collection process;

FIG. 11B is a diagram for explaining a system threshold value determination process;

FIG. 12A is a flowchart showing a processing flow executed in the scale control process;

FIG. 12D is a flowchart showing a processing flow executed in the scale control process;

FIG. 12E is a flowchart showing a processing flow executed in the scale control process;

DESCRIPTION OF THE PREFERRED EMBODIMENT

A computer system according to an embodiment of the present invention will be described with reference to the drawings. It should be noted that the present invention is not limited to the embodiment described below, and various modified examples can be employed within the scope of the present invention. In the following description, various types of information will be described in association with expressions such as a "table" and a "record," but may be expressed by data structures other than these data structures. Further, in the description of identification information, expressions such as a "number," "identification information," and a "name" are used, but these can be replaced with each other.

<Outline>

Figure 1:
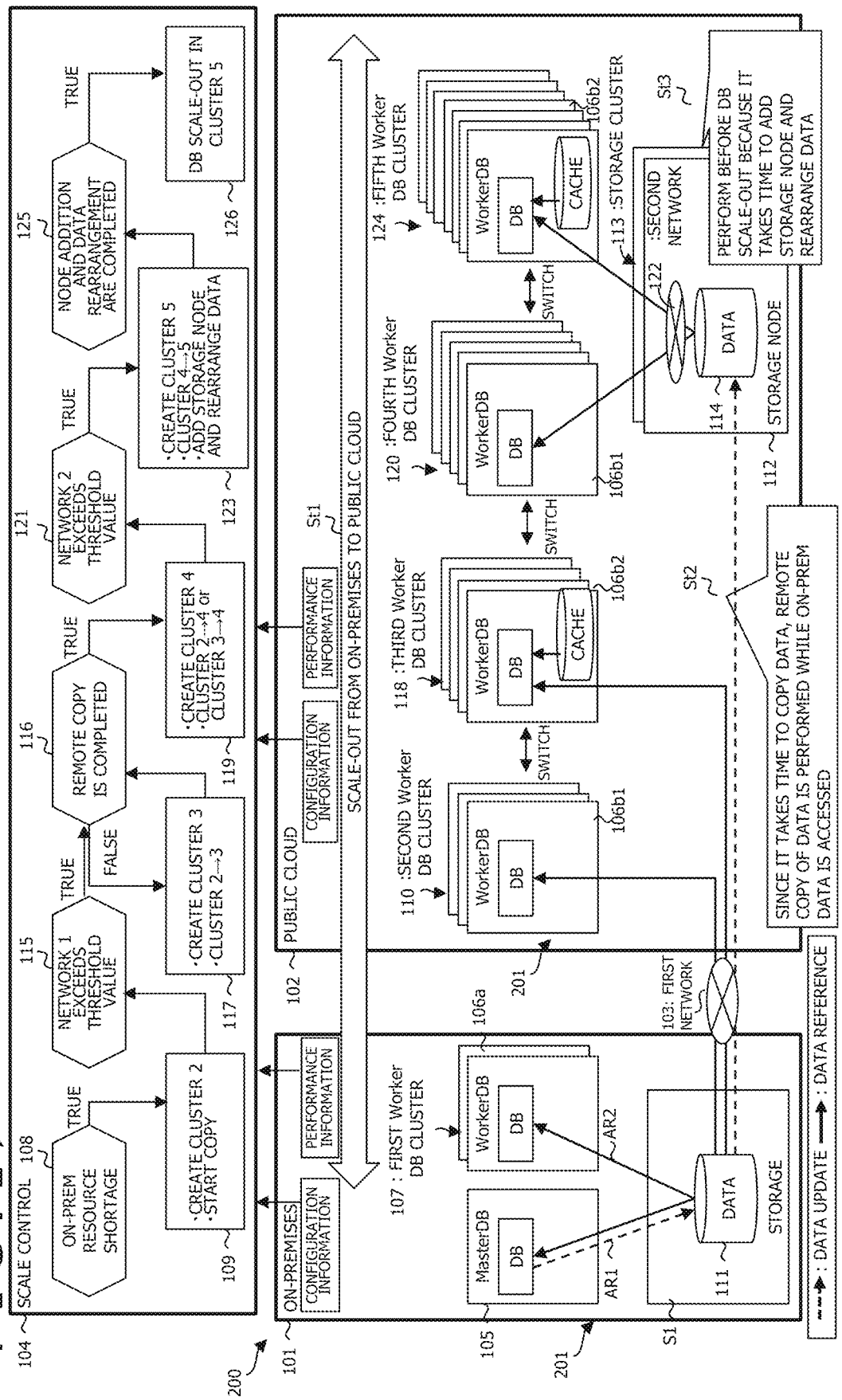
FIG. 1 is a diagram for explaining an outline of the present invention.

First, an outline of the present invention will be described in order to easily understand the present invention. FIG. 1 is a diagram for explaining an outline of the present invention. An example of a computer system according to the embodiment of the present invention is a computer system built in a hybrid cloud and is, for example, a hybrid cloud configuration data processing infrastructure system 200 shown in FIG. 1. Hereinafter, the hybrid cloud configuration data processing infrastructure system 200 is simply referred to as a "data processing infrastructure system 200."

The data processing infrastructure system 200 includes data processing systems 201 built on-premises 101 and in a public cloud 102. The concrete configurations of the data processing infrastructure system 200 and the data processing systems 201 will be described later in detail. It should be noted that the on-premises 101 may also be referred to as "on-prem" in the present specification and the drawings. The public cloud 102 may also be referred to as a "pub-cloud."

In the data processing infrastructure system 200, the on-premises 101 and the public cloud 102 are connected to each other via a first network 103. The data processing infrastructure system 200 is configured to be capable of executing scale-out (cloud bursting) from the on-premises 101 to the public cloud 102 by performing scale control 104 shown in the flowchart in FIG. 1 (see a description St1 in FIG. 1).

In the case where the cloud bursting is performed, the data processing infrastructure system 200 executes a method 100 of gradually scaling out the data processing systems 201.

The data processing system 201 built in the on-premises 101 includes a database for performing data processing. The database includes a storage unit for storing data and a control unit for controlling input/output and update of the data stored in the storage unit. The control unit of the database corresponds to a Master DB node 105 that is provided in the on-premises 101 and that performs data processing, and a first Worker DB cluster 107 (also referred to as a "cluster 1") including a plurality of Worker DB nodes 106a in the on-premises 101. The storage unit for storing data corresponds to a storage S1.

The Master DB node 105 can update data as indicated by a dashed-line arrow AR1 and refer to data as indicated by a solid-line arrow AR2. The Worker DB node 106a can only refer to data as indicated by the solid-line arrow AR2.

At the start of data processing, the Master DB node 105 and the first Worker DB cluster 107 in the on-premises 101 execute the data processing. More specifically, an application (for example, a data analysis application) accesses the Master DB node 105. The Master DB node 105 allocates query processing from the application (for example, the data analysis application), to the first Worker DB cluster 107 (a plurality of Worker DB nodes 106a) to perform the processing in a distributed manner.

The data processing infrastructure system 200 executes scale-out (adds (increases) the Worker DB nodes 106a that perform processing in a distributed manner) in the on-premises 101 according to the load of the query processing. In this case, resources in the on-premises 101 become insufficient (also referred to as an "on-prem resource shortage") in some cases due to an overload caused by an unexpected analysis request in the data processing infrastructure system 200. In this case, it becomes difficult for the data processing infrastructure system 200 to perform the scale-out (add (increase) the Worker DB nodes 106a) in the on-premises 101. Thus, the data processing infrastructure system 200 executes the scale control 104 to perform the scale-out (that is, cloud bursting) in the public cloud 102.

Specifically, in the case where it is determined in a determination 108 that a resource shortage (on-prem resource shortage) occurs in the on-premises 101, the scale control 104 proceeds to a process 109.

In the process 109, the scale control 104 executes the scale-out in the public cloud 102 by increasing (adding) a plurality of Worker DB nodes 106b1 (a second Worker DB cluster 110 (also referred to as a "cluster 2")) that have no cache and that execute query processing in a distributed manner.

Further, in the process 109, the scale control 104 remotely copies data stored in a first data storage area 111 (volume) of the storage S1 in the on-premises 101, to a second data storage area 114 (volume) of a storage cluster 113 including a plurality of storage nodes 112 in the public cloud 102.

At this time, it takes time to remotely copy data. Therefore, the remote copy is executed while the second Worker DB cluster 110 accesses the data stored in the first data storage area 111 in the on-premises 101, to perform the query processing (see a description St2). Accordingly, the scale control 104 can reduce the copy waiting time. That is, since, in parallel with the remote copy, the second Worker DB cluster 110 performs the query processing while accessing the data stored in the first data storage area 111 in the on-premises 101, the possibility of being unable to cope with an unexpected load due to the copy waiting time (the possibility of occurrence of performance deterioration) can be reduced.

Next, the scale control 104 proceeds to a determination 115 to determine whether or not the transfer amount of the first network 103 (also referred to as a "network 1") exceeds a threshold value (is larger than a threshold value). In the case where the transfer amount of the first network 103 exceeds the threshold value (that is, in the case of "TRUE"), the scale control 104 proceeds to a determination 116 to determine whether or not the above-described remote copy has been completed.

In the case where the transfer amount of the first network 103 exceeds the threshold value but the remote copy has not been completed (that is, in the case of "FALSE" in the determination 116), there is a possibility that the copy time becomes long or the performance is deteriorated. Thus, in this case, the scale control 104 proceeds to a process 117 to create and activate a plurality of Worker DB nodes 106b2 (a third Worker DB cluster 118 (also referred to as a "cluster 3")) that have caches and that execute query processing in a distributed manner. For example, the plurality of Worker DB nodes 106b2, which have caches, caches a part of data (for example, frequently accessed data) transferred from the storage S1. Accordingly, the scale control 104 can reduce the transfer amount of the first network 103, and thus, it is possible to reduce the possibility that the performance is deteriorated during the data copy or that the copy time becomes long.

It should be noted that, in the following description, the Worker DB node 106b1 having no cache and the Worker DB node 106b2 having a cache in the public cloud 102 will be referred to as "Worker DB nodes 106b" in the case where it is not necessary to distinguish them from each other. The Worker DB node 106b1 having no cache will also simply be referred to as a "Worker DB node 106b1" in some cases. The Worker DB node 106b2 having a cache will also simply be referred to as a "Worker DB node 106b2" in some cases. The Worker DB node 106a in the on-premises 101 and the Worker DB node 106b in the public cloud 102 will also simply be referred to as "Worker DB nodes 106" in some cases in the case where it is not necessary to distinguish them from each other. Further, the Worker DB node 106 will also be referred to as a "processing node" for convenience, in some cases. The above-described Master DB node 105 will also be referred to as a "management node" for convenience, in some cases.

It should be noted that, in the process 117, the scale control 104 changes all the Worker DB nodes 106b1 in the second Worker DB cluster 110 to a maintenance mode when creating and activating the third Worker DB cluster 118 (cluster 3). The scale control 104 deletes all the Worker DB nodes 106b1 from the second Worker DB cluster 110 after execution of the query processing is completed.

In the case where the transfer amount of the first network 103 exceeds the threshold value in the determination 115 and completion of the remote copy is "TRUE" in the determination 116, the scale control 104 proceeds to a process 119. In the process 119, the scale control 104 creates and activates a plurality of Worker DB nodes 106b1 (a fourth Worker DB cluster 120 (also referred to as a "cluster 4")) that have no cache and that execute query processing in a distributed manner. It should be noted that, in the process 119, the scale control 104 changes all the Worker DB nodes 106b2 in the third Worker DB cluster 118 to the maintenance mode when creating and activating the fourth Worker DB cluster 120 (cluster 4). The scale control 104 deletes all the Worker DB nodes 106b2 from the third Worker DB cluster 118 after execution of the query processing is completed.

It should be noted that in the case where the third Worker DB cluster 118 has not been created and activated in the process 119 (that is, in the case where it has not been determined in the determination 116 that completion of the remote copy is "FALSE"), the scale control 104 executes the next processing in the process 119. That is, when the fourth Worker DB cluster 120 (cluster 4) is created and activated, the scale control 104 changes all the Worker DB nodes 106b1 in the second Worker DB cluster 110 to the maintenance mode, and deletes the nodes from the second Worker DB cluster 110 after execution of the query processing is completed.

Thereafter, the scale control 104 proceeds to a determination 121 to determine whether or not the transfer amount of a network 122 for storage access (also referred to as a "second network 122" or a "network 2") in the storage cluster 113 exceeds the threshold value. It should be noted that the storage cluster 113 is a software defined storage (SDS) in which storage areas that are dispersedly located in a plurality of storage nodes 112 are managed by software to define all the areas as a large storage device. The storage node 112 is, for example, a virtual machine (for example, an EC2 instance of Amazon Web Services (AWS)) to which a storage volume (for example, Amazon Elastic Block Store (EBS) of Amazon Web Services (AWS)) is attached.

When it is determined in the determination 121 that the transfer amount of the second network 122 in the storage cluster 113 exceeds the threshold value, even if the scale control 104 adds (increases) the Worker DB nodes 106$b$1, the communication performance is not enhanced (because the transfer amount of the second network 122 becomes insufficient), and thus, the performance is not improved in some cases.

Thus, in the case where the transfer amount of the second network 122 exceeds the threshold value (that is, in the case of "TRUE"), the scale control 104 proceeds to a process 123 to create and activate a plurality of Worker DB nodes 106$b$2 (a fifth Worker DB cluster 124 with caches (also referred to as a "cluster 5")) that have caches and that execute query processing in a distributed manner. It should be noted that, when the fifth Worker DB cluster 124 (cluster 5) is created and activated, the scale control 104 changes all the Worker DB nodes 106$b$1 in the fourth Worker DB cluster 120 to the maintenance mode, and deletes the nodes from the fourth Worker DB cluster 120 after execution of the query processing is completed.

Further, the scale control 104 adds the storage node 112 to the storage cluster 113 in the process 123 and starts copying data for data rearrangement. At this time, it takes time to rearrange data (it takes time to copy data for data rearrangement).

To deal with this problem, the fifth Worker DB cluster 124 with caches is first created and activated as described above. Then, while accessing the data stored in the second data storage area 114 of the storage cluster 113, the fifth Worker DB cluster 124 with caches adds the storage node 112 and rearranges the data (see a description St3). For example, the plurality of Worker DB nodes 106$b$2, which have caches, cache a part of data (for example, frequently accessed data) transferred from the storage cluster 113. During the addition of the storage node 112 and the data rearrangement, the transfer amount of the second network 122 in the storage cluster 113 is decreased by switching to the fifth Worker DB cluster 124 with caches. Accordingly, the scale control 104 can reduce the transfer amount of the second network 122, and thus, the possibility that the performance is deteriorated during the addition of the storage node 112 and the data rearrangement can be reduced.

The scale control 104 proceeds to a determination 125 to determine whether or not the addition of the storage node 112 and the data copy for data arrangement have been completed. When it is determined in the determination 125 that completion of the addition of the storage node 112 and the data copy for data arrangement is "TRUE", the scale control 104 proceeds to a process 126. In the process 126, the scale control 104 changes the connection destination of the Worker DB node 106$b$2 that has a cache and that is included in the fifth Worker DB cluster 124 with caches. That is, the scale control 104 unmounts the copy source volume of the connection destination of the Worker DB node 106$b$2 having a cache, and then mounts the connection destination of the Worker DB node 106$b$2 having a cache to the copy destination volume.

It should be noted that, after the mounting, a plurality of Worker DB nodes 106$b$1 (a sixth Worker DB cluster (also referred to as a "cluster 6")) that have no cache and that execute query processing in a distributed manner may be created and activated. In this case, when the sixth Worker DB cluster ("cluster 6") is created and activated, the scale control 104 changes all the Worker DB nodes 106$b$2 in the fifth Worker DB cluster 124 to the maintenance mode, and deletes the nodes from the fifth Worker DB cluster 124 after execution of the query processing is completed.

As described above, the data processing infrastructure system 200 executes the scale control 104. Accordingly, the data processing infrastructure system 200 can reduce the possibility that the performance of the database is deteriorated in the cloud bursting, and can also reduce the possibility of being unable to cope with an unexpected load due to a data analysis application. It should be noted that, in the existing system described above in the [Description of the Related Art] section, data that has not been accessed frequently in the past is not copied to the public cloud. Therefore, in the case where data that has not frequently been accessed in the past is read from the storage after the data copy is completed in the existing system, a problem that the performance is deteriorated when data which is present in the on-premises environment is accessed, and that the analysis time becomes long possibly occurs. On the contrary, since the Worker DB node 106$b$ in the public cloud 102 accesses the data in the public cloud 102 after completion of the data copy, the possibility that the problem occurs as in the existing system is low in the data processing infrastructure system 200.

<Configuration>

FIG. 2 is a system configuration diagram showing a system configuration example of the data processing infrastructure system 200. The data processing infrastructure system 200 is configured to execute data processing and operation management. The data processing is executed in such a manner that the data processing system 201 in the on-premises 101 cooperates with a data processing system 201 in a virtual private cloud 203 for data processing in the public cloud 102 via the first network 103 for data processing.

The operation management is executed in such a manner that a monitoring tool 205 and a setting tool 206 in an operation management server 204 in the on-premises 101 cooperate with a construction automation server 209 and a monitoring server 210 in a virtual private cloud 208 for operation management in the public cloud 102 via a network 207 for operation management.

The data processing system 201 built in the on-premises 101 includes a plurality of data processing computers VM and a first storage S1. One of the plurality of data processing computers VM corresponds to the above-described Master DB node 105, and the other data processing computers VM correspond to the Worker DB nodes 106$a$. The plurality of data processing computers VM corresponding to the Worker DB nodes 106$a$ corresponds to the first Worker DB cluster 107.

The first storage S1 is connected to the data processing computers VM so as to mutually transmit and receive data, and provides the first data storage area 111 (volume) to the data processing computers VM. Each data processing computer VM is an information processing device (also referred to as a "server") including a central processing unit (CPU), a read-only memory (ROM), a random-access memory (RAM), an interface I/F, a data readable and writable non-volatile storage device, and the like. Each data processing computer VM may be a physical computer or a virtual computer (virtual machine). In the present example, each data processing computer VM is configured as a virtual computer. Hereinafter, each data processing computer VM will also be referred to as a "virtual computer VM." The first storage S1 is configured as a data readable and writable nonvolatile storage device. The storage S1 may include a plurality of storage devices.

In the case where the cloud bursting has been executed, the data processing system 201 built in the virtual private cloud 203 includes virtual computers VM and a storage S2. The virtual computers VM correspond to the above-described Worker DB nodes 106b. The virtual computers VM corresponding to the plurality of Worker DB nodes 106b correspond to the second Worker DB cluster 110 (the third Worker DB cluster 118, the fourth Worker DB cluster 120, and the fifth Worker DB cluster 124). It should be noted that the second Worker DB cluster 110, the third Worker DB cluster 118, the fourth Worker DB cluster 120, the fifth Worker DB cluster 124, and the above-described first Worker DB cluster 107 will be hereinafter referred to as "Worker DB clusters" in the case where it is not particularly necessary to distinguish them from each other. The Worker DB cluster will also be referred to as a "processing cluster" for convenience, in some cases.

The storage S2 corresponds to the storage cluster 113 including the plurality of storage nodes 112.

An operation administrator Man1 accesses the construction automation server 209 and the monitoring server 210 via a client PC 211 that is a terminal (personal computer) and that includes a display device 211a (display). The construction automation server 209 includes a system configuration information registration process 212, a workflow execution process 213, a scale control process 214, system configuration information 215, a workflow definition 216, and a construction/setting procedure 217. The monitoring server 210 includes a system performance information collection process 218, a system threshold value determination process 219, a system operation information display process 220, system performance information 221, and threshold value determination information 222.

Figure 3:
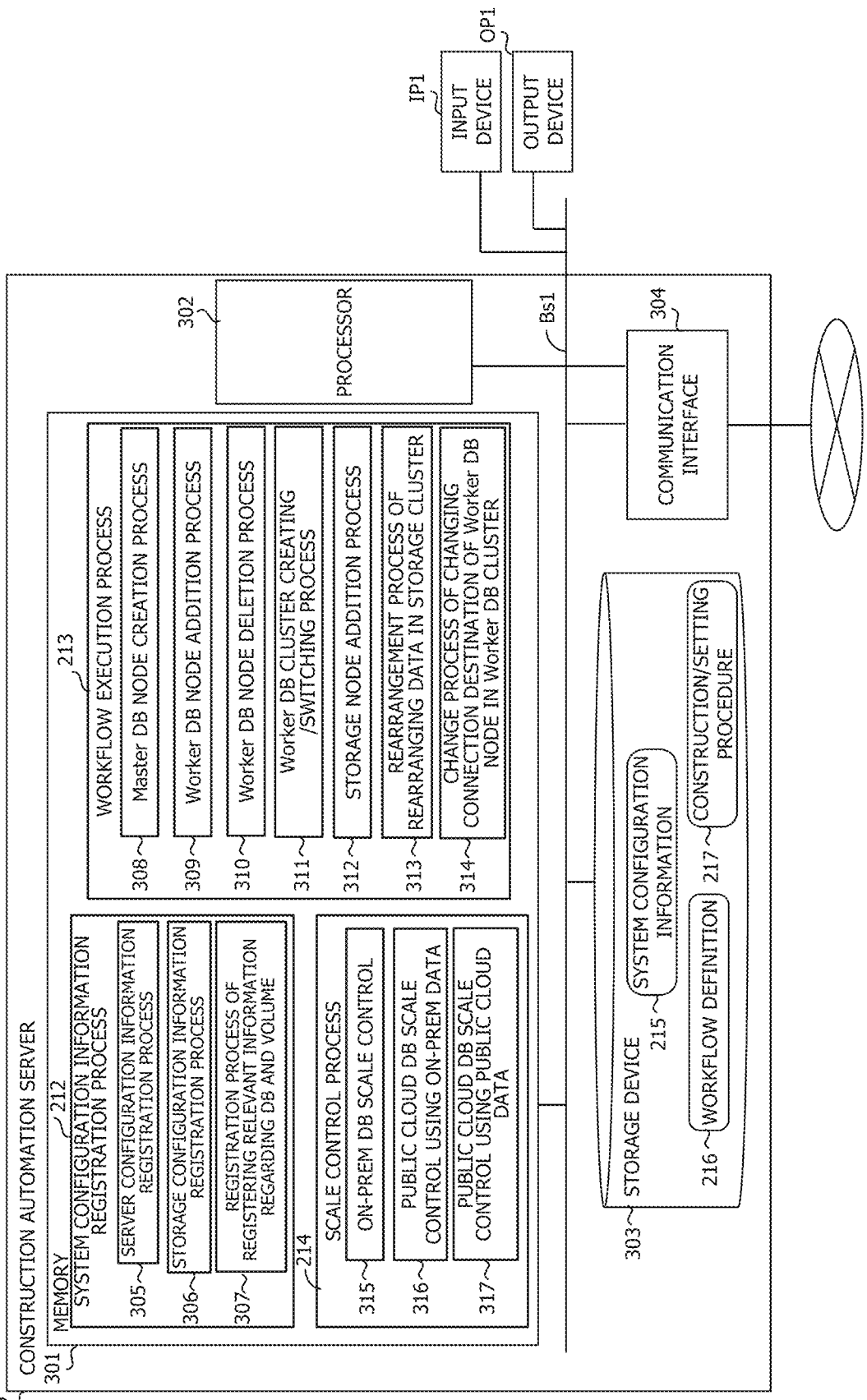
FIG. 3 is a schematic configuration diagram showing a hardware configuration example of a construction automation server.

FIG. 3 is a schematic configuration diagram showing a hardware configuration example of the construction automation server 209. The construction automation server 209 includes a memory 301, a processor 302, a storage device 303, a communication interface 304, and an input/output interface (not shown). These components are communicably connected to each other via a bus Bs1. An input device IP1 and an output device OP1 are connected to the construction automation server 209 via an input/output interface (not shown).

The memory 301 includes the system configuration information registration process 212, the workflow execution process 213, and the scale control process 214. The functions (processes) of the system configuration information registration process 212, the workflow execution process 213, and the scale control process 214 can be implemented when the processor 302 executes programs stored in the memory 301 by using the storage device 303 and the communication interface 304 as appropriate.

The system configuration information registration process 212 includes a server configuration information registration process 305, a storage configuration information registration process 306, and a registration process 307 of registering relevant information regarding a DB and a volume. The system configuration information registration process 212 includes programs that are stored in the memory 301 and that are to be executed by the processor 302.

The workflow execution process 213 includes a Master DB node creation process 308, a Worker DB node addition process 309, a Worker DB node deletion process 310, a Worker DB cluster creating/switching process 311, a storage node addition process 312, a rearrangement process 313 of rearranging data in a storage cluster, and a change process 314 of changing a connection destination of a Worker DB node in a Worker DB cluster. The workflow execution process 213 includes programs that are stored in the memory 301 and that are to be executed by the processor 302. It should be noted that the Worker DB cluster creating/switching process 311 will also be referred to as a "Worker DB cluster switching process 311" hereinafter in some cases.

The scale control process 214 includes an on-prem DB scale control process 315, an public cloud DB scale control process 316 using on-prem data, and a public cloud DB scale control process 317 using public cloud data. The scale control process 214 includes programs that are stored in the memory 301 and that are to be executed by the processor 302.

The storage device 303 stores the system configuration information 215, the workflow definition 216, and the construction/setting procedure 217. It should be noted that the system configuration information 215, the workflow definition 216, and the construction/setting procedure 217 will be described later in detail.

The communication interface 304 is an interface for connecting to a network. It should be noted that information regarding input and output between the operation management server 204 (FIG. 2) in the on-premises 101, the data processing system 201 (FIG. 2) in the public cloud 102, and the monitoring server 210 (FIG. 2 and FIG. 4) in the public cloud 102, and information regarding input and output from the client PC 211 (FIG. 2) via the Web browser are input and output via the communication interface 304.

Figure 4:
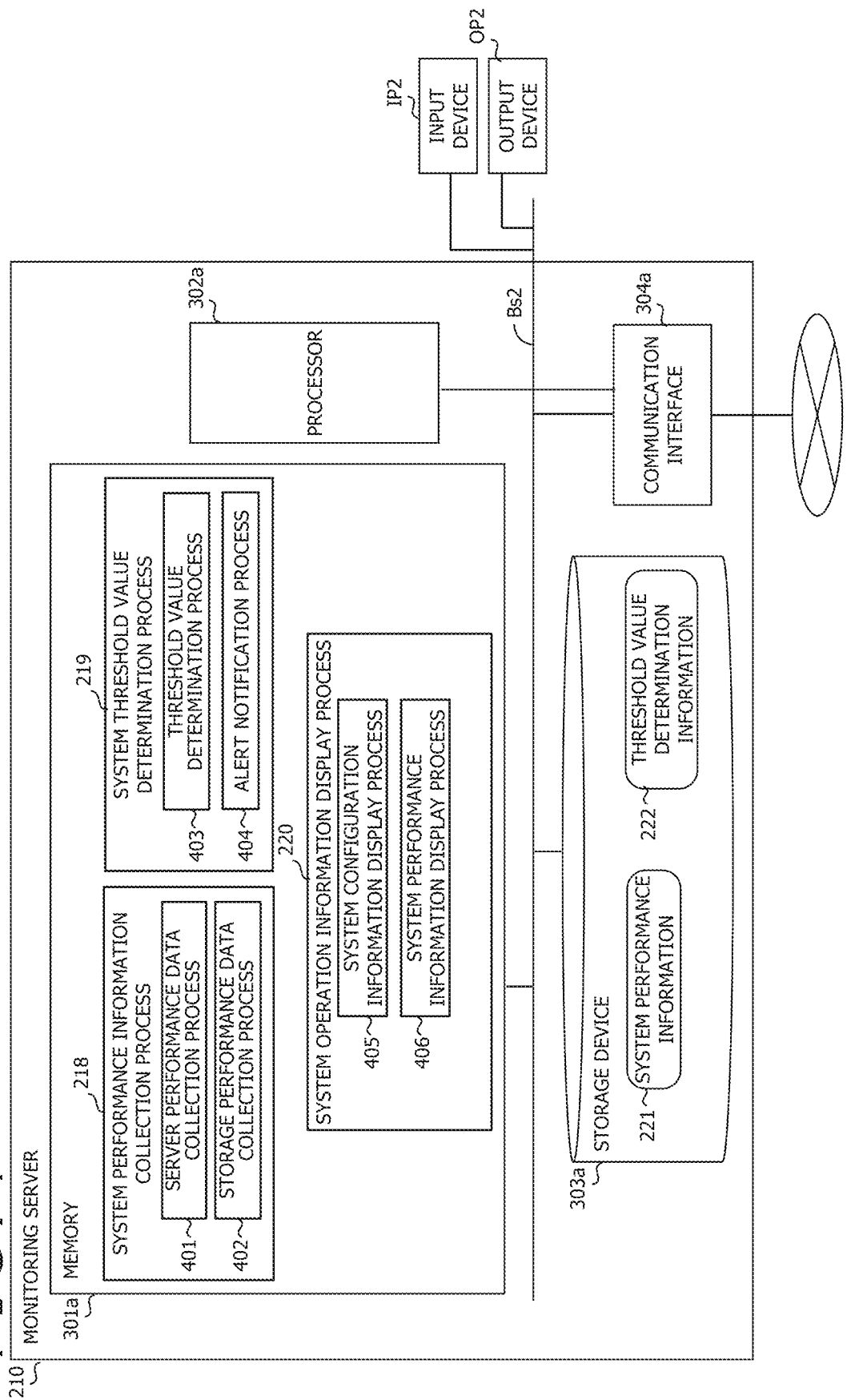
FIG. 4 is a schematic configuration diagram showing a hardware configuration example of a monitoring server.

FIG. 4 is a schematic configuration diagram showing a hardware configuration example of the monitoring server 210. The monitoring server 210 includes a memory 301a, a processor 302a, a storage device 303a, a communication interface 304a, and an input/output interface (not shown). These components are communicably connected to each other via a bus Bs2. An input device IP2 and an output device OP2 are connected to the monitoring server 210 via an input/output interface (not shown).

The memory 301a includes the system performance information collection process 218, the system threshold value determination process 219, and the system operation information display process 220. The functions (processes) of the system performance information collection process 218, the system threshold value determination process 219, and the system operation information display process 220 can be implemented when the processor 302a executes programs stored in the memory 301a by using the storage device 303a and the communication interface 304a as appropriate.

The system performance information collection process 218 includes a server performance data collection process 401 and a storage performance data collection process 402. The system performance information collection process 218 includes programs that are stored in the memory 301a and that are to be executed by the processor 302a.

The system threshold value determination process 219 includes a threshold value determination process 403 and an alert notification process 404. The system threshold value determination process 219 includes programs that are stored in the memory 301a and that are to be executed by the processor 302a.

The system operation information display process 220 includes a system configuration information display process 405 and a system performance information display process 406. The system operation information display process 220 includes programs that are stored in the memory 301a and that are to be executed by the processor 302a.

The storage device 303a stores the system performance information 221 and the threshold value determination information 222. It should be noted that the system performance information 221 and the threshold value determination information 222 will be described later in detail.

The communication interface 304a is an interface for connecting to a network. It should be noted that information regarding input and output between the operation management server 204 (FIG. 2) in the on-premises 101, the data processing system 201 (FIG. 2) in the public cloud 102, and the construction automation server 209 (FIG. 2 and FIG. 3) in the public cloud 102, and information regarding input and output from the client PC 211 (FIG. 2) via the Web browser are input and output via the communication interface 304a.

FIG. 5A is a diagram for explaining details of DB information DB1 included in the system configuration information 215 stored in the storage device 303 of the construction automation server 209. The DB information DB1 includes a server configuration information table 501, a DB configuration information table 505, a Worker DB cluster configuration information table 509, and a relevant information table 516 regarding a DB and a volume.

The server configuration information table 501 includes a physical server name 502, a DB node name 503, and an Internet protocol (IP) address 504 as columns each having information (value) therein. In the server configuration information table 501, pieces of information in the respective columns related to the server configuration are associated with each other and stored as a collection of information (records) in a row unit.

The DB configuration information table 505 includes a system name 506, a Master DB node name 507, and an IP address 508 as columns each having information (value) therein. In the DB configuration information table 505, pieces of information in the respective columns related to the DB configuration are associated with each other and stored as a collection of information (records) in a row unit.

The Worker DB cluster configuration information table 509 includes a Worker DB cluster name 510, a location 511, presence or absence of cache 512, the number of Worker DB nodes 513, a Worker DB node name 514, and an IP address 515 as columns each having information (value) therein. In the Worker DB cluster configuration information table 509, pieces of information in the respective columns related to the configuration of the Worker DB cluster are associated with each other and stored as a collection of information (records) in a row unit.

The relevant information table 516 regarding a DB and a volume includes a system name 517, a DB node name 518, an IP address 519, a volume name 520, a capacity 521, a port name 522, and a path name 523 as columns each having information (value) therein. In the relevant information table 516 regarding a DB and a volume, pieces of information in the respective columns related to the relation between the DB and the volume are associated with each other and stored as a collection of information (records) in a row unit.

FIG. 5B is a diagram for explaining details of storage information SI1 included in the system configuration information 215 stored in the storage device 303 of the construction automation server 209. As shown in FIG. 5B, the storage information SI1 includes a storage cluster configuration information table 524, a remote copy configuration information table 533, and a local copy configuration information table 542.

The storage cluster configuration information table 524 includes a storage cluster name 525, the number of nodes 526, a storage node name 527, an IP address 528, a volume name 529, a capacity 530, a port name 531, and a path name 532 as columns each having information (value) therein. In the storage cluster configuration information table 524, pieces of information in the respective columns related to the storage cluster 113 are stored as a collection of information (records) in a row unit.

The remote copy configuration information table 533 includes a copy source storage name 534, a copy source volume name 535, a capacity 536, a copy source port name 537, a copy destination storage cluster name 538, a copy destination volume name 539, a copy destination port name 540, and a copy destination path name 541 as columns each having information (value) therein. In the remote copy configuration information table 533, pieces of information in the respective columns related to the remote copy are associated with each other and stored as a collection of information (records) in a row unit.

The local copy configuration information table 542 includes a copy source volume name 543, a capacity 544, a copy source port name 545, a copy destination volume name 546, a copy destination port name 547, and a copy destination path name 548 as columns each having information (value) therein. In the local copy configuration information table 542, pieces of information in the respective columns related to the local copy are associated with each other and stored as a collection of information (records) in a row unit.

FIG. 6A is a diagram for explaining a DB server construction/setting procedure PR1 included in the construction/setting procedure 217 stored in the storage device 303 of the construction automation server 209. The DB server construction/setting procedure PR1 is information indicating a DB server construction/setting procedure, and each process included in the DB server construction/setting procedure PR1 is shown in a flowchart of FIG. 6A.

As shown in FIG. 6A, the DB server construction/setting procedure PR1 includes a DB template creation process 601, a creation process 604 of creating a DB having no cache, a creation process 607 of creating a DB having a cache, and a volume initial setting process 609.

The DB template creation process 601 is a process in which a DB install process 602 and a DB template creation process 603 are executed in the described order.

The creation process 604 of creating a DB having no cache is a process in which an activation process 605 of activating a VM having no cache from a DB template and an initial setting process 606 are executed in the described order.

The creation process 607 of creating a DB having a cache is a process in which an activation process 608 of activating a VM with cache from a DB template and the initial setting process 606 are executed in the described order.

The volume initial setting process 609 is a process in which a partition creation process 610, a file format process 611, and a mount process 612 are executed in the described order.

Figure 6B:
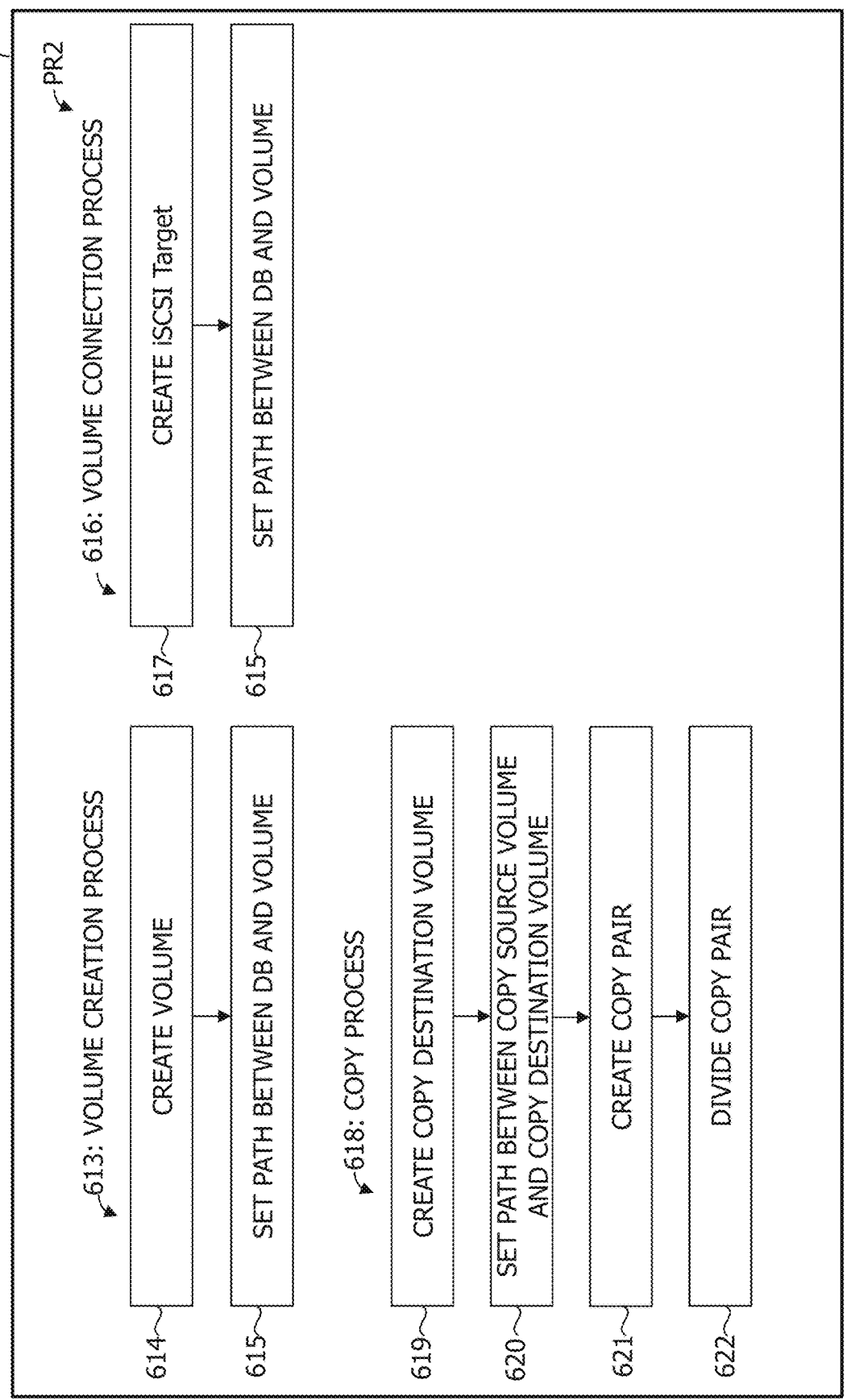
FIG. 6B is a diagram for explaining a storage setting procedure included in the construction/setting procedure.

FIG. 6B is a diagram for explaining a storage setting procedure PR2 included in the construction/setting procedure 217 stored in the storage device 303 of the construction automation server 209. The storage setting procedure PR2 is information indicating a storage setting procedure, and each process included in the storage setting procedure PR2 is shown in a flowchart of FIG. 6B.

As shown in FIG. 6B, the storage setting procedure PR2 includes a volume creation process 613, a volume connection process 616, and a copy process 618.

The volume creation process 613 is a process in which a volume creation process 614 and a path setting process 615 of setting a path between the DB and the volume are executed in the described order.

The volume connection process 616 is a process in which an Internet small computer system interface (iSCSI) Target creation process 617 and the path setting process 615 of setting a path between the DB and the volume are executed in the described order.

The copy process 618 is a process in which a copy destination volume creation process 619, a path setting process 620 of setting a path between the copy source volume and the copy destination volume, a copy pair creation process 621, and a copy pair division process 622 are executed in the described order.

Figure 7B:
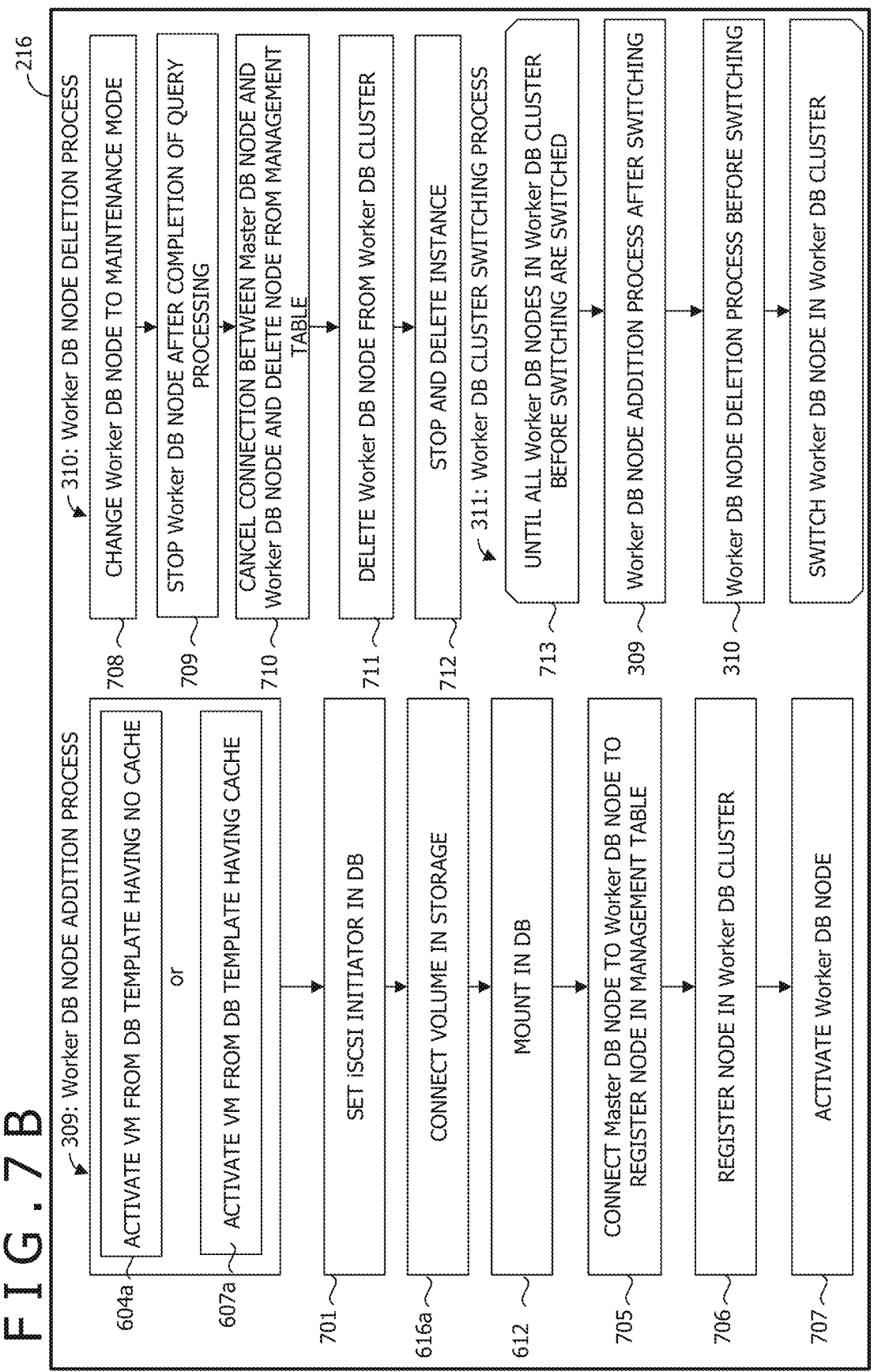
FIG. 7B is a diagram for explaining a Worker DB node addition process, a Worker DB node deletion process, and a Worker DB cluster switching process.
Figure 7C:
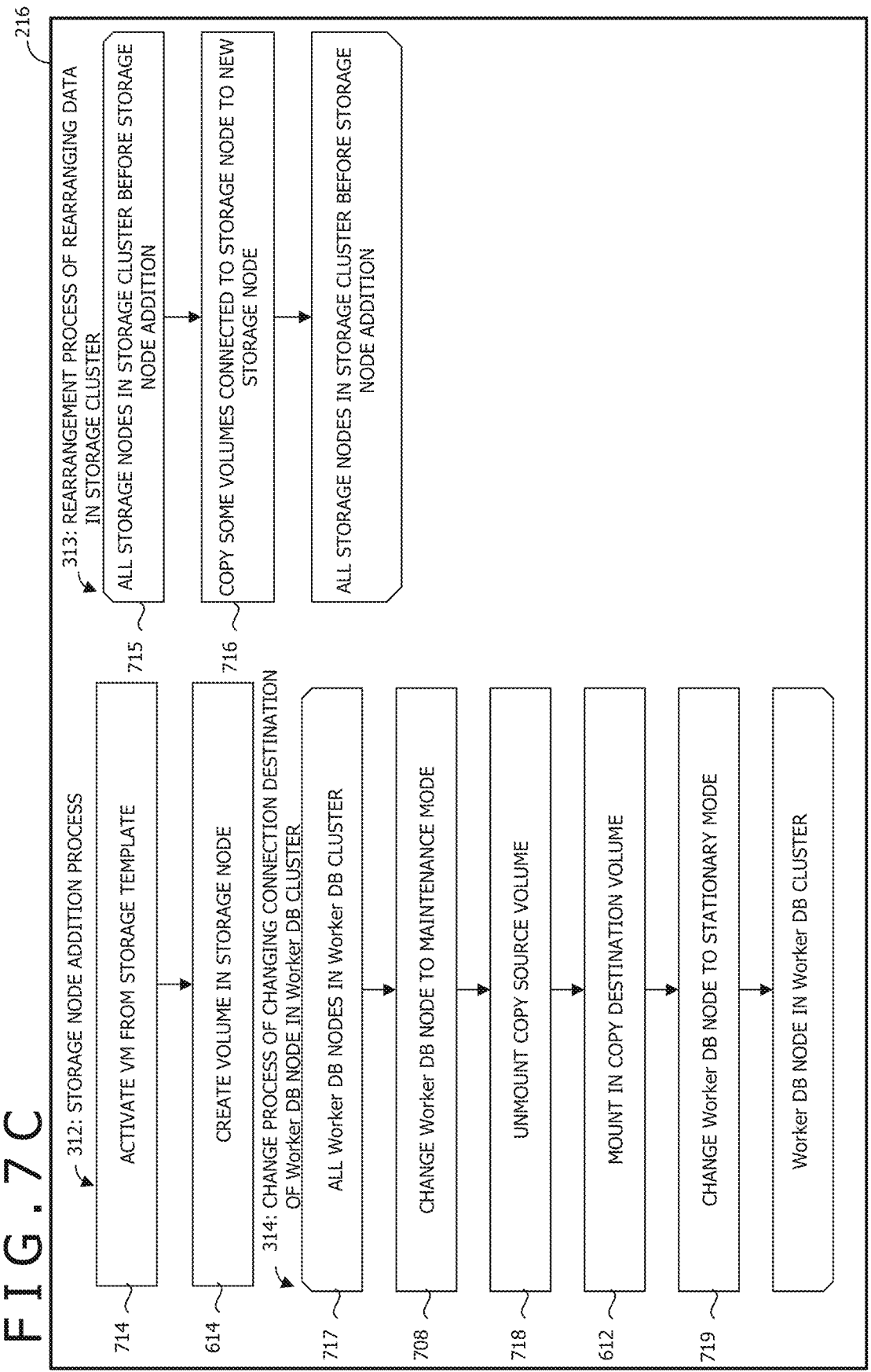
FIG. 7C is a diagram for explaining a storage node addition process, a rearrangement process of rearranging data in a storage cluster, and a change process of changing a connection destination of a Worker DB node in a Worker DB cluster.

FIG. 7A to FIG. 7C are diagrams for explaining the Master DB node creation process 308, the Worker DB node addition process 309, the Worker DB node deletion process 310, the Worker DB cluster switching process 311, the storage node addition process 312, the rearrangement process 313 of rearranging data in a storage cluster, and the change process 314 of changing a connection destination of a Worker DB node in a Worker DB cluster, the processes being included in the workflow definition 216. The workflow definition 216 is information that defines (or describes) operations (processes, work, and orders) and the like necessary for carrying out processing of the workflow execution process 213. The workflow definition 216 is shown in flowcharts of FIG. 7A to FIG. 7C.

As shown in FIG. 7A, according to the workflow definition of the Master DB node creation process 308, it is defined that the following processes are performed in the described order. Specifically, a process 604a of activating a VM from a DB template having no cache is executed in the creation process 604 of creating a DB having no cache, and a setting process 701 of setting an iSCSI initiator in a DB is executed. Then, a process 613a of creating a volume in a storage is executed in the volume creation process 613, and a process 609a of initializing a volume in a DB is executed in the volume initial setting process 609. Subsequently, a DB construction process 702, a data load process 703, and a Master DB node registration process 704 are executed.

As shown in FIG. 7B, according to the workflow definition of the Worker DB node addition process 309, it is defined that the following processes are performed in the described order. Specifically, the process 604a of activating a VM from a DB template having no cache is executed in the creation process 604 of creating a DB having no cache, or a process 607a of activating a VM from a DB template having a cache is executed in the creation process 607 of creating a DB having a cache. Then, the setting process 701 of setting the iSCSI initiator in a DB is executed, a process 616a of connecting a volume in a storage is executed in the volume connection process 616, and the mount process 612 is executed in a DB. Subsequently, a management table registration process 705 of connecting the Master DB node 105 to the Worker DB node 106 to register the node in the management table, a registration process 706 of registering the node in a Worker DB cluster, and a Worker DB node activation process 707 are performed.

According to the workflow definition of the Worker DB node deletion process 310, it is defined that a process 708 of changing the Worker DB node 106b to the maintenance mode, a Worker DB node stop process 709 after completion of query processing, a process 710 of canceling the connection between the Master DB node 105 and the Worker DB node 106 to delete the node from the management table, a Worker DB node deletion process 711 of deleting a Worker DB node from a Worker DB cluster, and an instance stop/deletion process 712 are executed in the described order.

According to the workflow definition of the Worker DB cluster switching process 311, it is defined that a repeating process 713 on all the Worker DB nodes in the Worker DB cluster that has not been switched, the Worker DB node addition process 309 after switching, and the Worker DB node deletion process 310 before switching are executed in the described order.

As shown in FIG. 7C, according to the workflow definition of the storage node addition process 312, it is defined that a VM activation process 714 of activating a VM from a storage template and the volume creation process 614 of creating a volume in a storage node are executed in this order.

According to the workflow definition of the rearrangement process 313 of rearranging data in a storage cluster, it is defined that a repeating process 715 on all the storage nodes in the storage cluster before addition of a storage node and a process 716 of copying some volumes connected to the storage node to a new storage node are executed in the described order.

According to the workflow definition of the change process 314 of changing a connection destination of a Worker DB node in a Worker DB cluster, it is defined that a repeating process 717 on all the Worker DB nodes in the Worker DB cluster, a process 708 of changing the Worker DB node to the maintenance mode, an unmount process 718 of unmounting the copy source volume, the mount process 612 of mounting in the copy destination volume, and a process 719 of changing the Worker DB node 106 to the stationary mode are executed in the described order.

FIG. 8A is a diagram for explaining DB performance information DB2 included in the system performance information 221 stored in the storage device 303a of the monitoring server 210. As shown in FIG. 8A, the DB performance information DB2 included in the system performance information 221 includes a physical server performance information table 801, a performance information table 806 indicating performance by DB node, and a Worker DB cluster performance information table 812.

The physical server performance information table 801 includes a date and time 802, a physical server name 803, a CPU utilization rate 804, and a network transfer amount 805 as columns each having information (value) therein. In the physical server performance information table 801, pieces of information in the respective columns related to the physical server performance are associated with each other and stored as a collection of information (records) in a row unit.

The performance information table 806 indicating performance by DB node includes a date and time 807, a DB node name 808, an IP address 809, a CPU utilization rate 810, and a network transfer amount 811 as columns each having information (value) therein. In the performance information table 806 indicating performance by DB node, pieces of information in the respective columns related to the performance based on a DB node are associated with each other and stored as a collection of information (records) in a row unit.

The Worker DB cluster performance information table 812 includes a date and time 813, a Worker DB cluster name 814, a CPU utilization rate 815, and a network transfer amount 816 as columns each having information (value)

therein. In the Worker DB cluster performance information table 812, pieces of information in the respective columns related to the Worker DB cluster performance are associated with each other and stored as a collection of information (records) in a row unit.

FIG. 8B is a diagram for explaining storage performance information SI2 included in the system performance information 221 stored in the storage device 303a of the monitoring server 210.

The storage performance information SI2 included in the system performance information 221 includes a performance information table 817 indicating performance by storage node and a storage cluster performance information table 824.

The performance information table 817 indicating performance by storage node includes a date and time 818, a storage node name 819, an IP address 820, a CPU utilization rate 821, a network transfer amount 822, and a storage transfer amount 823 as columns each having information (value) therein. In the performance information table 817 indicating performance by storage node, pieces of information in the respective columns related to the performance based on a storage node are associated with each other and stored as a collection of information (records) in a row unit.

The storage cluster performance information table 824 includes a date and time 825, a storage cluster name 826, a CPU utilization rate 827, a network transfer amount 828, and a storage transfer amount 829 as columns each having information (value) therein. In the storage cluster performance information table 824, pieces of information in the respective columns related to the storage cluster performance are associated with each other and stored as a collection of information (records) in a row unit.

FIG. 9 is a diagram for explaining each piece of information included in the threshold value determination information 222 stored in the storage device 303a of the monitoring server 210. As shown in FIG. 9, the threshold value determination information 222 includes a Worker DB cluster threshold value information table 901, a storage cluster threshold value information table 906, an alert occurrence condition table 912, and an alert occurrence information table 916.

The Worker DB cluster threshold value information table 901 includes a Worker DB cluster name 902, a CPU utilization rate 903, a network transfer amount 904, and a storage transfer amount 905 as columns each having information (value) therein. In the Worker DB cluster threshold value information table 901, pieces of information in the respective columns related to the threshold value applied to the Worker DB cluster are associated with each other and stored as a collection of information (records) in a row unit.

The storage cluster threshold value information table 906 includes a storage cluster name 907, the number of storage nodes 908, a CPU utilization rate 909, a network transfer amount 910, and a storage transfer amount 911 as columns each having information (value) therein. In the storage cluster threshold value information table 906, pieces of information in the respective columns related to the threshold value applied to the storage cluster 113 are associated with each other and stored as a collection of information (records) in a row unit.

The alert occurrence condition table 912 includes a metrics name 913, a period 914, and the number of times 915 as columns each having information (value) therein. In the alert occurrence condition table 912, pieces of information in the respective columns related to the alert occurrence conditions are associated with each other and stored as a collection of information (records) in a row unit.

The alert occurrence information table 916 includes a date and time 917, an alert name 918, and an occurrence location 919 as columns each having information (value) therein. In the alert occurrence information table 916, pieces of information in the respective columns related to the alert are associated with each other and stored as a collection of information (records) in a row unit.

<Process Executed by System>

Hereinafter, processes executed by the data processing infrastructure system 200 will be described. It should be noted that the processes will be described by using a "program" or a function block as a subject of a sentence in the following description in some cases. However, since the program is executed by a CPU to perform a predetermined process, the CPU or the function block may be used as a subject of a sentence when the process is described. Similarly, the main unit that executes the program to perform the process may be a controller, a device, a system, a computer, or a node having a processor.

Figure 10A:
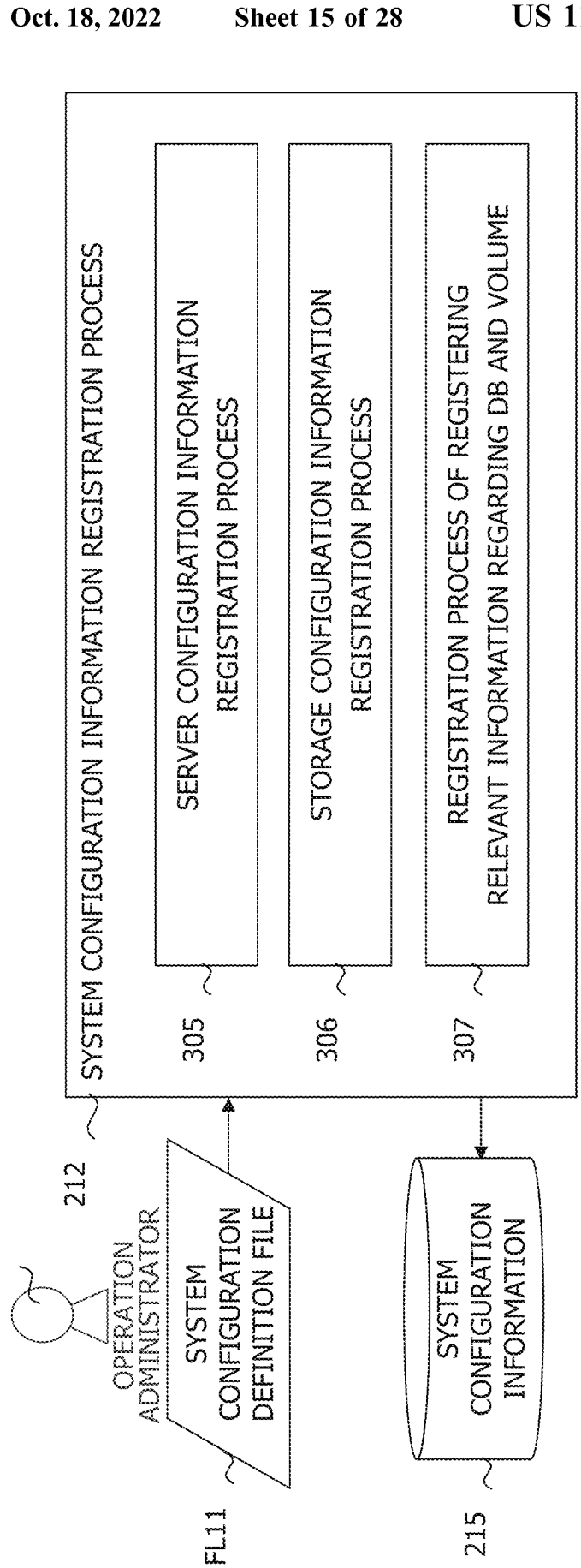
FIG. 10A is a diagram for explaining a system configuration information registration process.
Figure 10C:
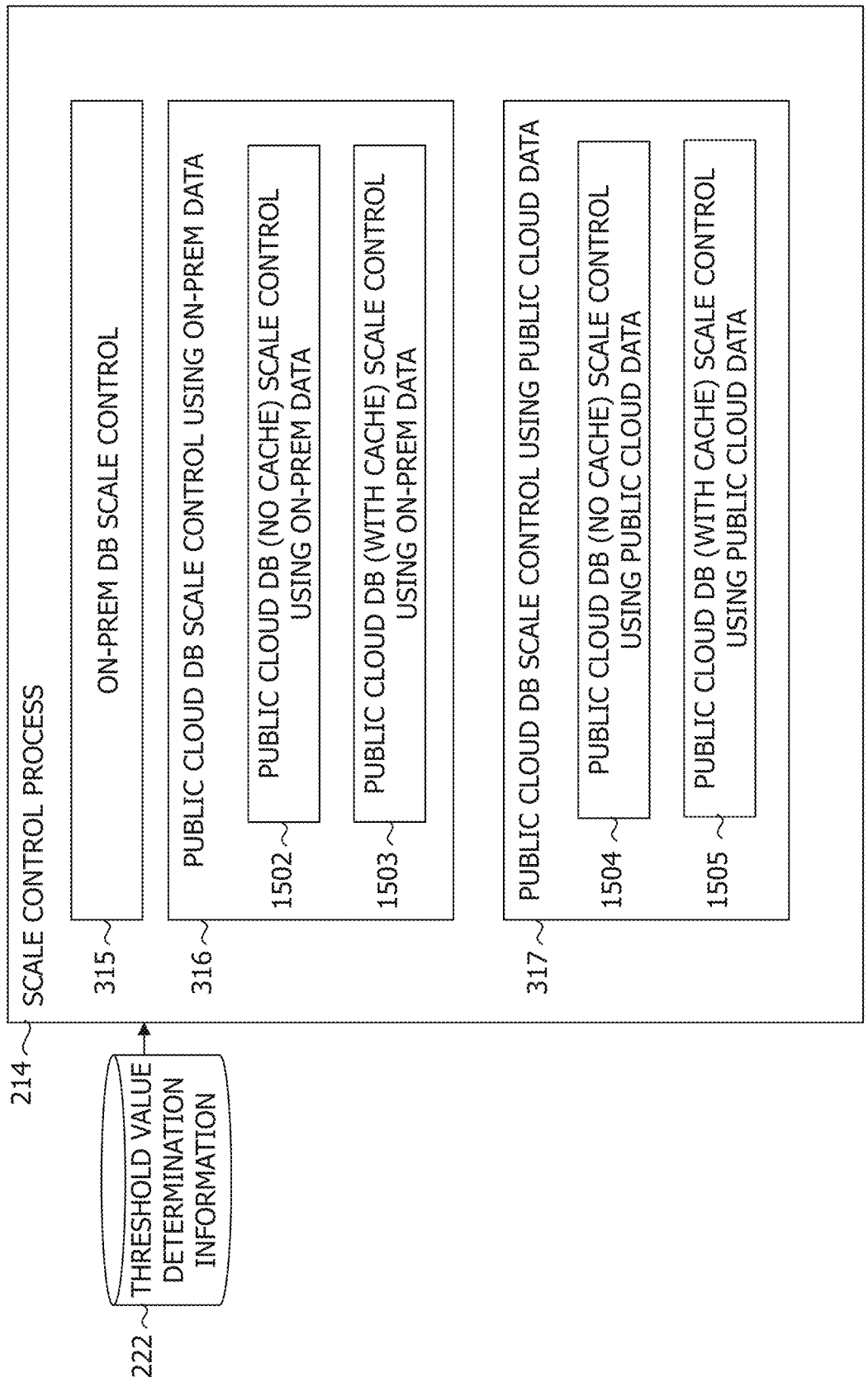
FIG. 10C is a diagram for explaining a scale control process.

FIG. 10A to FIG. 10C are diagrams for explaining processes executed by the construction automation server 209 shown in FIG. 3.

As shown in FIG. 10A, when receiving a system configuration definition file FL11 from the operation administrator Man1, the system configuration information registration process 212 of the construction automation server 209 executes the server configuration information registration process 305, the storage configuration information registration process 306, and the registration process 307 of registering relevant information regarding a DB and a volume, and stores the resultant information in the system configuration information 215.

As shown in FIG. 10B, when receiving the system configuration information 215, the workflow definition 216, and the construction/setting procedure 217, the workflow execution process 213 of the construction automation server 209 executes the Master DB node creation process 308, the Worker DB node addition process 309, the Worker DB node deletion process 310, the Worker DB cluster switching process 311, the storage node addition process 312, the rearrangement process 313 of rearranging data in a storage cluster, and the change process 314 of changing a connection destination of a Worker DB node in a Worker DB cluster, and stores the resultant information in the system configuration information 215.

As shown in FIG. 10C, when receiving the threshold value determination information 222, the scale control process 214 of the construction automation server 209 executes the on-prem DB scale control process 315, the public cloud DB scale control process 316 using on-prem data, and the public cloud DB scale control process 317 using public cloud data. The public cloud DB scale control process 316 using on-prem data includes a public cloud DB (no cache) scale control process 1502 using on-prem data and a public cloud DB (with cache) scale control process 1503 using on-prem data. The public cloud DB scale control process 317 using public cloud data includes a public cloud DB (no cache) scale control process 1504 using public cloud data and a public cloud DB (with cache) scale control process 1505 using public cloud data. It should be noted that the scale control process 214 will be described later in detail.

Figure 11C:
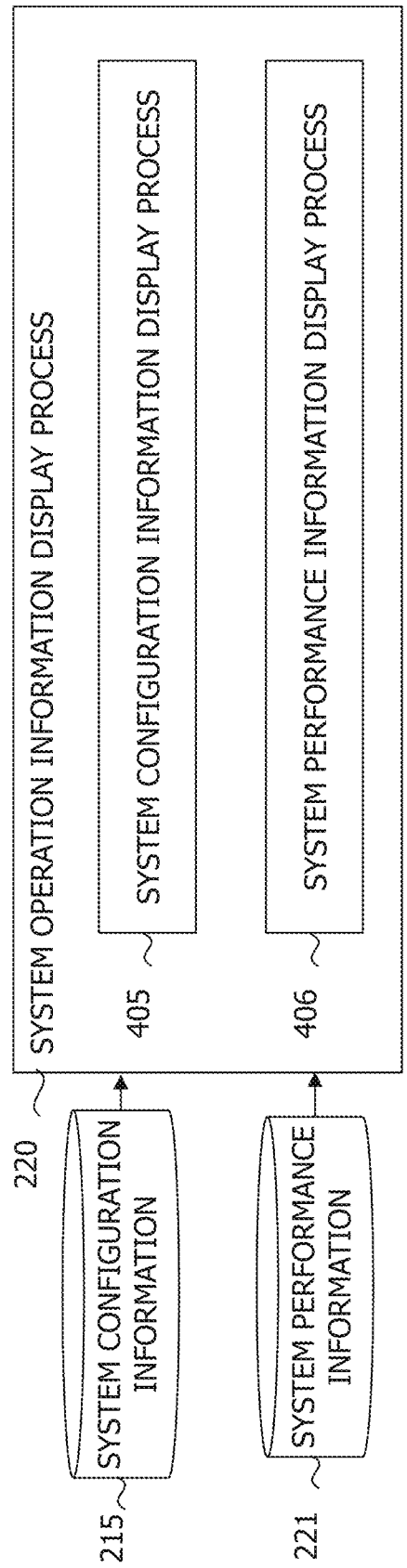
FIG. 11C is a diagram for explaining a system operation information display process.

FIG. 11A to FIG. 11C are diagrams for explaining a process (monitoring process) executed by the monitoring server 210.

As shown in FIG. 11A, when receiving system monitoring data 1601 from the operation management server 204 and the data processing system 201 in the public cloud 102, the system performance information collection process 218 of the monitoring server 210, which is shown in FIG. 4, executes the server performance data collection process 401 and the storage performance data collection process 402, and stores the resultant data in the system performance information 221.

As shown in FIG. 11B, when receiving the system performance information 221 and the threshold value determination information 222, the system threshold value determination process 219 of the monitoring server 210 executes the threshold value determination process 403 and the alert notification process 404, and stores the resultant information in the threshold value determination information 222.

As shown in FIG. 11C, when receiving the system configuration information 215 and the system performance information 221, the system operation information display process 220 of the monitoring server 210 executes the system configuration information display process 405 and the system performance information display process 406, and displays the resultant information on the Web browser of the client PC 211.

<Scale Control Process>

The scale control process 214 described above executes a processing flow shown in flowcharts of FIG. 12A to FIG. 12F.

The scale control process 214 starts the on-prem DB scale control process 315 in FIG. 12A and proceeds to Step 1201. In Step 1201, the scale control process 214 refers to the system performance information 221 collected by the system performance information collection process 218 of the monitoring server 210, to monitor the CPU utilization rate of the Worker DB cluster in the on-premises 101.

Thereafter, the scale control process 214 proceeds to Step 1202. In Step 1202, the scale control process 214 refers to the threshold value determination information 222 collected by the system threshold value determination process 219 of the monitoring server 210, to determine whether or not the CPU utilization rate of the Worker DB cluster has exceeded the threshold value in the on-premises 101.

In the case where the CPU utilization rate of the Worker DB cluster has not exceeded the threshold value in the on-premises 101, the scale control process 214 determines in Step 1202 that the excess of the CPU utilization rate is "FALSE," and returns to Step 1201.

In the case where the CPU utilization rate of the Worker DB cluster has exceeded the threshold value in the on-premises 101, the scale control process 214 determines in Step 1202 that the excess of the CPU utilization rate is "TRUE," and proceeds to Step 1203. In Step 1203, it is determined whether or not the resources (server resources) in the on-premises 101 are insufficient.

In the case where the resources (server resources) in the on-premises 101 are not insufficient, the scale control process 214 determines in Step 1203 that the insufficient resource is "FALSE," and proceeds to Step 1204. In Step 1204, the scale control process 214 adds the Worker DB node 106*a* in the on-premises 101 in the Worker DB node addition process 309 described above, and then returns to Step 1201.

In the case where the resources (server resources) in the on-premises 101 are insufficient, the scale control process 214 determines in Step 1203 that the insufficient resource is "TRUE," and sequentially executes the processes of Step 1205 and Step 1206 to be described below.

Step 1205: The scale control process 214 executes the Worker DB node addition process 309 described above to add the Worker DB node 106*b*1 having no cache in the public cloud 102.

Step 1205: The scale control process 214 copies persistence data (that is, data stored in the first data storage area 111 of the storage S1) to the second data storage area 114 (volume) in the public cloud 102.

Figure 12B:
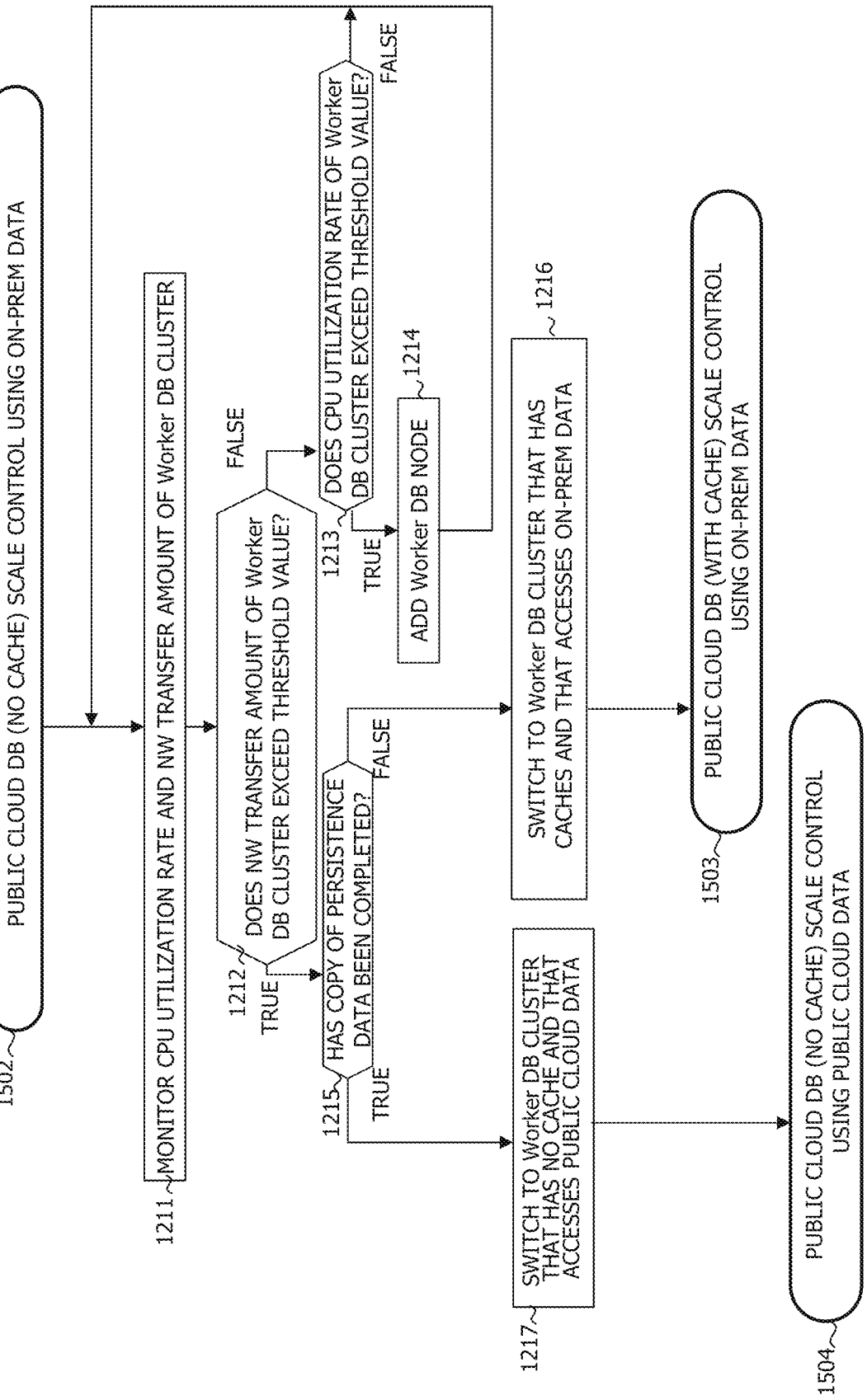
FIG. 12B is a flowchart showing a processing flow executed in the scale control process.

Thereafter, the scale control process 214 proceeds to the public cloud DB (no cache) scale control process 1502 using on-prem data in FIG. 12B.

FIG. 12B is a flowchart showing the public cloud DB (no cache) scale control process 1502 using on-prem data.

The scale control process 214 starts the public cloud DB (no cache) scale control process 1502 using on-prem data and proceeds to Step 1211.

In Step 1211, the scale control process 214 refers to the system performance information 221 collected by the system performance information collection process 218 of the monitoring server 210, to monitor the CPU utilization rate and the network transfer amount (NW transfer amount) of the Worker DB cluster (that is, the second Worker DB cluster 110) in the public cloud 102.

Thereafter, the scale control process 214 proceeds to Step 1212, and refers to the threshold value determination information 222 collected by the system threshold value determination process 219 of the monitoring server 210, to determine whether or not the network transfer amount (NW transfer amount) of the Worker DB cluster in the public cloud 102 has exceeded the threshold value.

In the case where the network transfer amount (NW transfer amount) of the Worker DB cluster has not exceeded the threshold value, the scale control process 214 determines in Step 1212 that the excess of the network transfer amount is "FALSE," and proceeds to Step 1213. In Step 1213, the scale control process 214 refers to the threshold value determination information 222 collected by the system threshold value determination process 219 of the monitoring server 210, to determine whether or not the CPU utilization rate of the Worker DB cluster in the public cloud 102 has exceeded the threshold value.

In the case where the CPU utilization rate of the Worker DB cluster in the public cloud 102 has not exceeded the threshold value, the scale control process 214 determines in Step 1213 that the excess of the CPU utilization rate is "FALSE," and returns to Step 1211.

In the case where the CPU utilization rate of the Worker DB cluster in the public cloud 102 has exceeded the threshold value, the scale control process 214 determines in Step 1213 that the excess of the CPU utilization rate is "TRUE," and proceeds to Step 1214. In Step 1214, the scale control process 214 adds the Worker DB node 106*b*1 in the Worker DB node addition process 309 described above. Thereafter, the scale control process 214 returns to Step 1211.

In the case where the network transfer amount of the Worker DB cluster has exceeded the threshold value in Step 1212, the scale control process 214 determines in Step 1212 that the excess of the network transfer amount is "TRUE," and proceeds to Step 1215.

In Step 1215, the scale control process 214 determines whether or not the persistence data copy (that is, the above-described remote copy) has been completed.

In the case where the persistence data copy has not been completed, the scale control process 214 determines in Step 1215 that the completion of the persistence data copy is "FALSE," and proceeds to Step 1216. In Step 1216, the Worker DB cluster switching process 311 described above is executed to switch to the Worker DB cluster that has caches and that accesses on-prem data (that is, the third Worker DB cluster 118). Thereafter, the scale control process 214 proceeds to the public cloud DB (with cache) scale control process 1503 using on-prem data in FIG. 12C.

In the case where the persistence data copy has been completed, the scale control process 214 determines in Step 1215 that the completion of the persistence data copy is "TRUE," and proceeds to Step 1217. In Step 1217, the Worker DB cluster switching process 311 described above is executed to switch to the Worker DB cluster that has no cache and that accesses public cloud data (that is, the fourth Worker DB cluster 120). Thereafter, the scale control process 214 proceeds to the public cloud DB (no cache) scale control process 1504 using public cloud data in FIG. 12D.

Figure 12C:
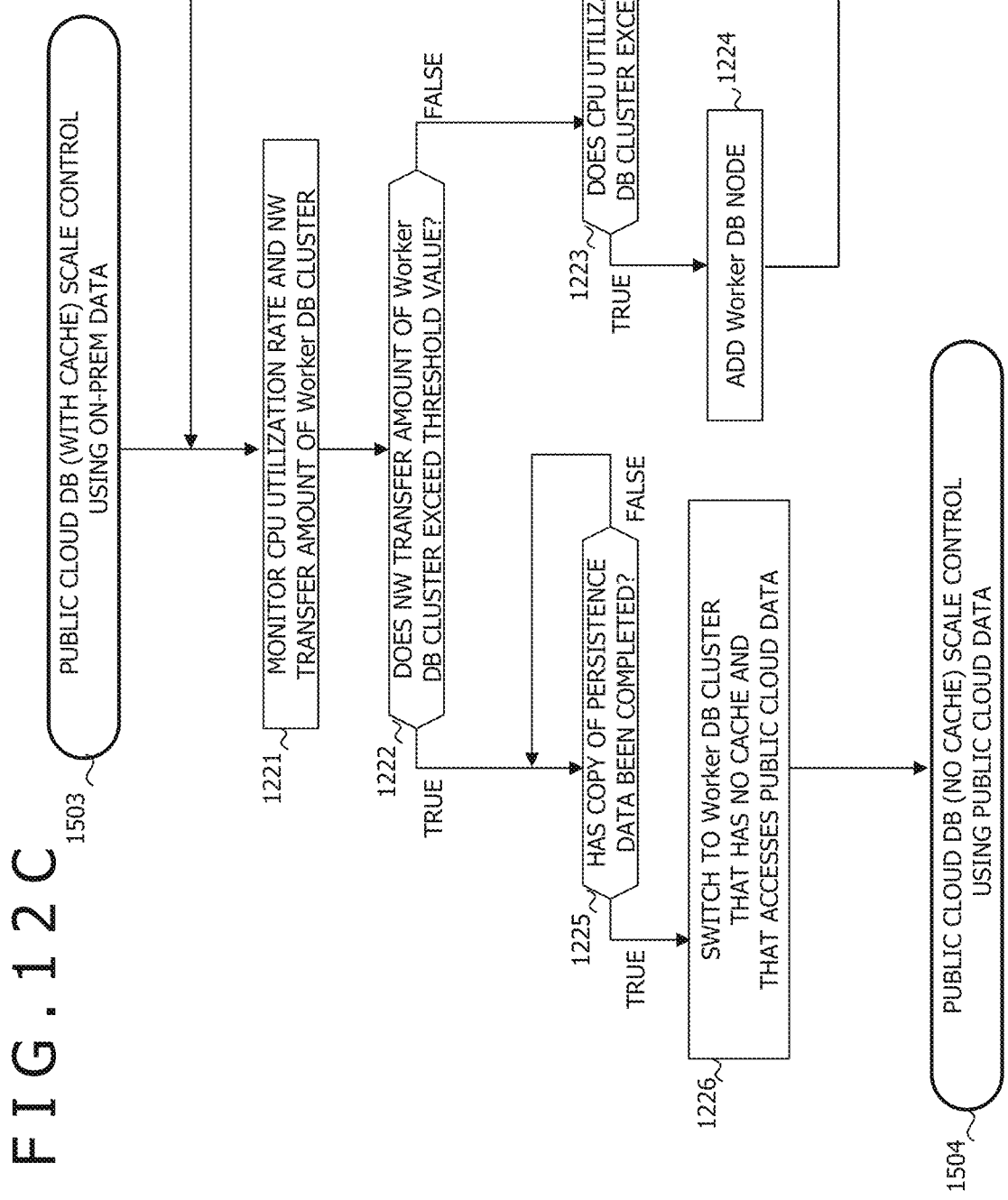
FIG. 12C is a flowchart showing a processing flow executed in the scale control process.

FIG. 12C is a flowchart showing the public cloud DB (with cache) scale control process 1503 using on-prem data.

The scale control process 214 starts the public cloud DB (with cache) scale control process 1503 using on-prem data and proceeds to Step 1221.

In Step 1221, the scale control process 214 refers to the system performance information 221 collected by the system performance information collection process 218 of the monitoring server 210, to monitor the CPU utilization rate and the network transfer amount (NW transfer amount) of the Worker DB cluster in the public cloud 102.

Thereafter, the scale control process 214 proceeds to Step 1222, and refers to the threshold value determination information 222 collected by the system threshold value determination process 219 of the monitoring server 210, to determine whether or not the network transfer amount of the Worker DB cluster in the public cloud 102 has exceeded the threshold value.

In the case where the network transfer amount of the Worker DB cluster has not exceeded the threshold value, the scale control process 214 determines in Step 1222 that the excess of the network transfer amount is "FALSE," and proceeds to Step 1223. In Step 1223, it is determined whether or not the CPU utilization rate of the Worker DB cluster in the public cloud 102 has exceeded the threshold value.

In the case where the CPU utilization rate of the Worker DB cluster in the public cloud 102 has not exceeded the threshold value, the scale control process 214 determines in Step 1223 that the excess of the CPU utilization rate is "FALSE," and returns to Step 1221.

In the case where the CPU utilization rate of the Worker DB cluster in the public cloud 102 has exceeded the threshold value, the scale control process 214 determines in Step 1223 that the excess of the CPU utilization rate is "TRUE," and proceeds to Step 1223. In Step 1223, the scale control process 214 adds the Worker DB node 106b2 in the Worker DB node addition process 309 described above. Thereafter, the scale control process 214 returns to Step 1221.

In the case where the network transfer amount of the Worker DB cluster has exceeded the threshold value in Step 1222, the scale control process 214 determines in Step 1222 that the excess of the network transfer amount is "TRUE," and proceeds to Step 1225. In Step 1225, it is determined whether or not the persistence data copy has been completed.

In the case where the persistence data copy has not been completed, the scale control process 214 determines in Step 1225 that the completion of the persistence data copy is "FALSE," and executes the process of Step 1225 again.

In the case where the persistence data copy has been completed, the scale control process 214 determines in Step 1225 that the completion of the persistence data copy is "TRUE," and proceeds to Step 1226. In Step 1226, the Worker DB cluster switching process 311 described above is executed to switch to the Worker DB cluster that has no cache and that accesses public cloud data (that is, the fourth Worker DB cluster 120). Thereafter, the scale control process 214 proceeds to the public cloud DB (no cache) scale control process 1504 using public cloud data in FIG. 12D.

FIG. 12D is a flowchart showing the public cloud DB (no cache) scale control process 1504 using public cloud data. The scale control process 214 starts the public cloud DB (no cache) scale control process 1504 using public cloud data, and sequentially executes the processes of Step 1231 and Step 1232 to be described below. Then, the scale control process 214 proceeds to Step 1233.

Step 1231: The scale control process 214 refers to the system performance information 221 collected by the system performance information collection process 218 of the monitoring server 210, to monitor the storage transfer amount of the storage cluster 113.

Step 1232: The scale control process 214 refers to the system performance information 221 collected by the system performance information collection process 218 of the monitoring server 210, to monitor the CPU utilization rate and the network transfer amount (NW transfer amount) of the Worker DB cluster in the public cloud 102.

Thereafter, the scale control process 214 proceeds to Step 1233, and refers to the threshold value determination information 222 collected by the system threshold value determination process 219 of the monitoring server 210, to determine whether or not the CPU utilization rate or the network transfer amount of the Worker DB cluster has exceeded the threshold value.

In the case where both the CPU utilization rate and the network transfer amount are equal to or smaller than the threshold value, the scale control process determines in Step 1233 that the excesses of the CPU utilization rate and the network transfer amount are "FALSE," and returns to Step 1231.

On the contrary, in the case where the CPU utilization rate or the network transfer amount has exceeded the threshold value, the scale control process 214 determines in Step 1233 that the excess of the CPU utilization rate or the network transfer amount is "TRUE," and proceeds to Step 1234.

In Step 1234, the scale control process 214 determines whether or not the storage transfer amount of the storage cluster 113 is insufficient (that is, whether or not the storage transfer amount has exceeded the threshold value).

In the case where the storage transfer amount of the storage cluster 113 is not insufficient, the scale control process determines in Step 1234 that the insufficient storage transfer amount is "FALSE," and proceeds to Step 1235. In Step 1235, the Worker DB node addition process 309 adds the Worker DB node 106b1. Thereafter, the scale control process 214 returns to Step 1231.

On the contrary, in the case where the storage transfer amount of the storage cluster 113 is insufficient, the scale control process 214 determines in Step 1234 that the insufficient storage transfer amount is "TRUE," and sequentially executes the processes of Step 1236 to Step 1238 to be described below. Then, the scale control process 214 proceeds to Step 1239.

Step 1236: The scale control process 214 switches to the Worker DB cluster that has caches and that accesses public cloud data (that is, the fifth Worker DB cluster 124) in the Worker DB cluster switching process 311.

Step 1237: The scale control process 214 adds a storage node to the storage cluster 113 in the storage node addition process 312.

Step 1238: The scale control process 214 executes the rearrangement of the data in the storage cluster in the rearrangement process 313 of rearranging data in a storage cluster.

In Step 1239, the scale control process 214 determines whether or not the storage node addition and the data rearrangement have been completed.

In the case where the storage node addition and the data rearrangement have not been completed, the scale control process 214 determines in Step 1239 that the completion of the storage node addition and the data rearrangement is "FALSE," and executes Step 1239 again.

In the case where the storage node addition and the data rearrangement have been completed, the scale control process 214 determines in Step 1239 that the completion of the storage node addition and the data rearrangement is "TRUE," and proceeds to Step 1240. In Step 1240, the connection destination of the Worker DB node 106b2 in the Worker DB cluster is changed in the process of the change process 314 of changing a connection destination of a Worker DB node in a Worker DB cluster. Thereafter, the scale control process 214 proceeds to the public cloud DB (with cache) scale control process 1505 using public cloud data.

FIG. 12E is a flowchart showing the public cloud DB (with cache) scale control process 1505 using public cloud data. The scale control process 214 starts the public cloud DB (with cache) scale control process 1505 using public cloud data, and sequentially executes the processes of Step 1241 and Step 1242 to be described below. Then, the scale control process 214 proceeds to Step 1243.

Step 1241: The scale control process 214 refers to the system performance information 221 collected by the system performance information collection process 218 of the monitoring server 210, to monitor the storage transfer amount of the storage cluster 113.

Step 1242: The scale control process 214 refers to the system performance information 221 collected by the system performance information collection process 218 of the monitoring server 210, to monitor the CPU utilization rate and the network transfer amount (NW transfer amount) of the Worker DB cluster.

Thereafter, the scale control process 214 proceeds to Step 1243, and refers to the threshold value determination information 222 collected by the system threshold value determination process 219 of the monitoring server 210, to determine whether or not the CPU utilization rate or the network transfer amount of the Worker DB cluster has exceeded the threshold value.

In the case where both the CPU utilization rate and the network transfer amount are equal to or smaller than the threshold value, the scale control process 214 determines in Step 1243 that the excesses of the CPU utilization rate and the network transfer amount are "FALSE," and returns to Step 1241.

On the contrary, in the case where the CPU utilization rate or the network transfer amount has exceeded the threshold value, the scale control process 214 determines in Step 1243 that that the excess of the CPU utilization rate or the network transfer amount is "TRUE," and proceeds to Step 1244 to determine whether or not the storage transfer amount of the storage cluster 113 is insufficient, by referring to the system performance information 221 collected by the system performance information collection process 218 of the monitoring server 210.

In the case where the storage transfer amount of the storage cluster 113 is not insufficient, the scale control process 214 determines in Step 1244 that the insufficient storage transfer amount is "FALSE," and executes the process of Step 1245 to be described below. Then, the scale control process 214 returns to Step 1241.

Step 1245: The scale control process 214 adds the Worker DB node 106b2 in the Worker DB node addition process 309.

On the contrary, in the case where the storage transfer amount of the storage cluster is insufficient, the scale control process 214 determines in Step 1244 that the insufficient storage transfer amount is "TRUE," and sequentially executes the processes of Step 1246 and Step 1247 to be described below. Then, the scale control process 214 proceeds to Step 1248.

Step 1246: The scale control process 214 adds the storage node 112 to the storage cluster 113 in the storage node addition process 312.

Step 1247: The scale control process 214 executes the rearrangement of the data in the storage cluster in the rearrangement process 313 of rearranging data in a storage cluster.

In Step 1248, the scale control process 214 determines whether or not the storage node addition and the data rearrangement have been completed.

In the case where the storage node addition and the data rearrangement have not been completed, the scale control process 214 determines in Step 1248 that the completion of the storage node addition and the data rearrangement is "FALSE," and executes Step 1248 again.

In the case where the storage node addition and the data rearrangement have been completed, the scale control process 214 determines in Step 1248 that the completion of the storage node addition and the data rearrangement is "TRUE," and proceeds to Step 1249. In Step 1249, the connection destination of the Worker DB node 106b2 in the Worker DB cluster is changed.

Thereafter, the scale control process 214 proceeds to Step 1250 to temporarily stop the processing flow. Thereafter, the scale control process 214 starts again the public cloud DB (with cache) scale control process 1505 using public cloud data.

Figure 12F:
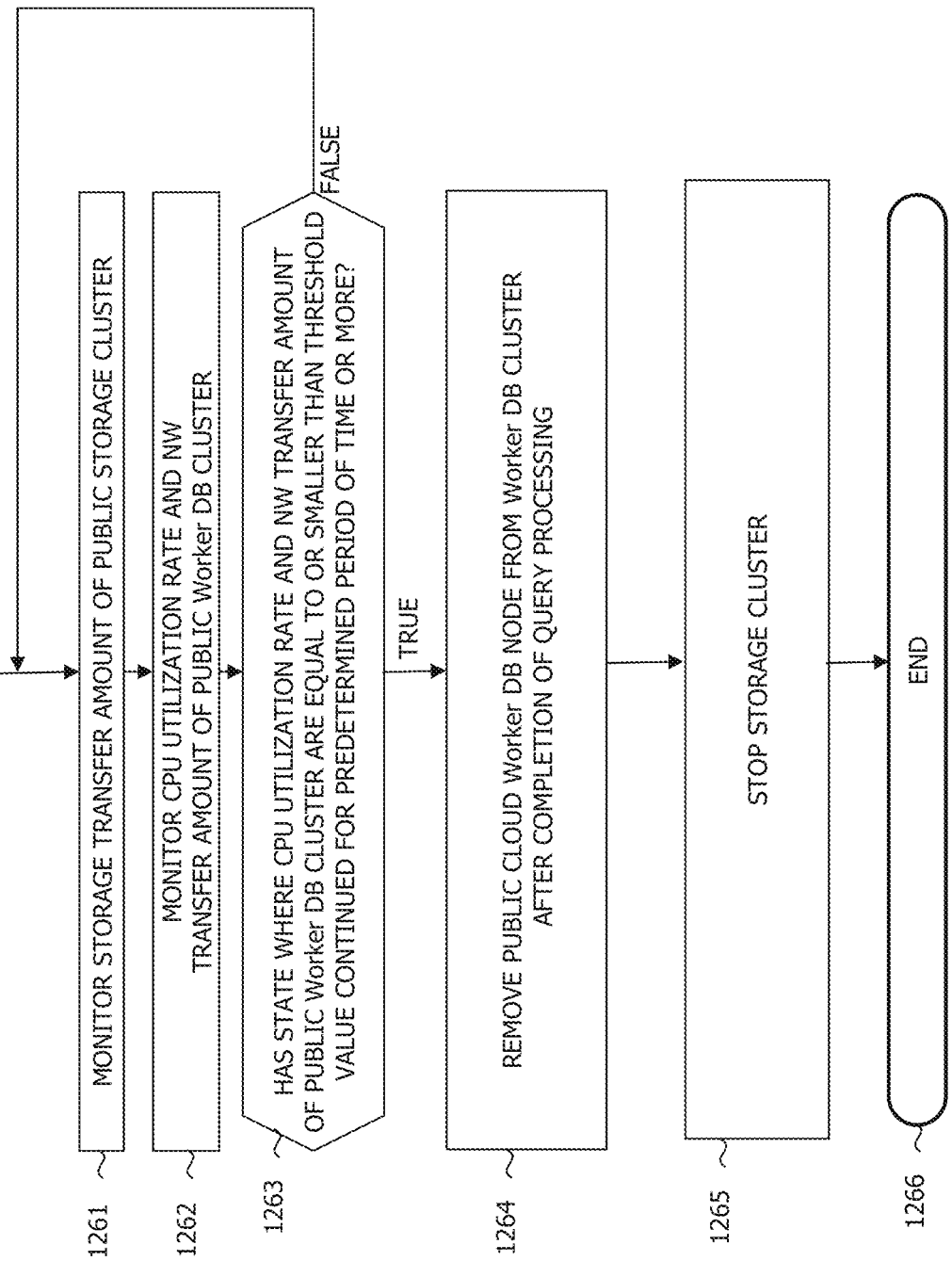
FIG. 12F is a flowchart showing a processing flow executed in the scale control process.

It should be noted that the scale control process 214 executes the public cloud DB scale control process termination determination 1506 shown in FIG. 12F after the cloud bursting. Therefore, after the cloud bursting, the scale control process 214 starts the public cloud DB scale control process termination determination 1506, and sequentially executes the processes of Step 1261 and Step 1262 to be described below. Then, the scale control process 214 proceeds to Step 1263.

Step 1261: The scale control process 214 refers to the system performance information 221 collected by the system performance information collection process 218 of the monitoring server 210, to monitor the storage transfer amount of the storage cluster 113.

Step 1262: The scale control process 214 refers to the system performance information 221 collected by the system performance information collection process 218 of the monitoring server 210, to monitor the CPU utilization rate and the network transfer amount (NW transfer amount) of the Worker DB cluster.

In Step 1263, the scale control process 214 determines whether or not a state where the CPU utilization rate of the Worker DB cluster in the public cloud 102 is equal to or smaller than the threshold value and where the network transfer amount (NW transfer amount) is equal to or smaller than the threshold value has continued for a predetermined period of time or more.

In the case where a state where the CPU utilization rate of the public cloud Worker DB cluster is equal to or smaller than the threshold value and where the network transfer amount (NW transfer amount) is equal to or smaller than the threshold value has not continued for a predetermined period of time or more, the scale control process 214 determines in Step 1263 that the continued state is "FALSE," and returns to Step 1261.

In the case where a state where the CPU utilization rate of the public cloud Worker DB cluster is equal to or smaller than the threshold value and where the network transfer amount (NW transfer amount) is equal to or smaller than the threshold value has continued for a predetermined period of time or more, the scale control process 214 determines in Step 1263 that the continued state is "TRUE," and sequentially executes the processes of Step 1264 and Step 1265 to be described below. Then, the scale control process 214 proceeds to Step 1266 to temporarily stop the processing flow.

Step 1264: After the query processing is completed, the scale control process 214 removes the Worker DB node 106b in the public cloud 102 from the Worker DB cluster. In other words, the scale control process 214 executes scale-in to reduce the number of Worker DB nodes 106b in the public cloud 102 to 0.

Step 1265: The scale control process 214 stops the storage cluster 113.

<System Operation Information Display Image>

Figure 13A:
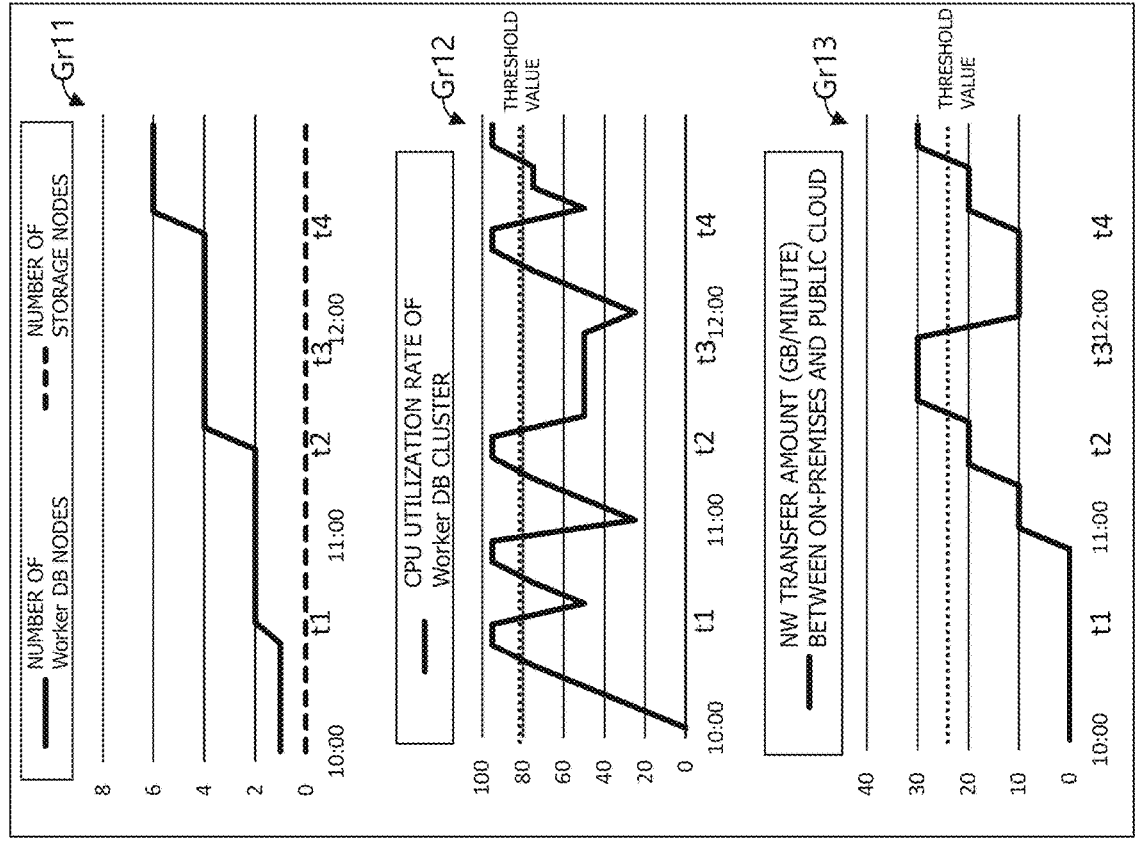
FIG. 13A is a diagram showing examples of operation information display images at the time of execution of scale-out.
Figure 13B:
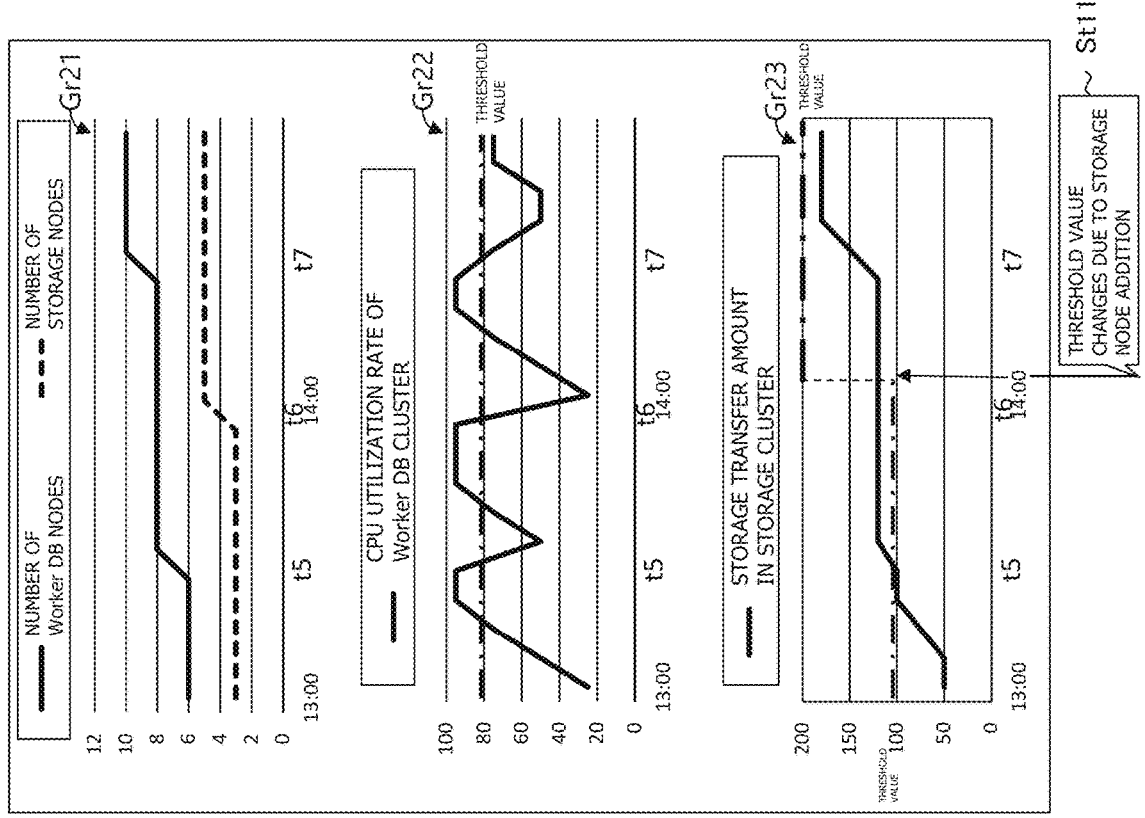
FIG. 13B is a diagram showing examples of the operation information display images at the time of execution of scale-out.

FIG. 13A and FIG. 13B are examples of graphical user interface (GUI) images showing operation information display results at the time of execution of scale-out.

A system operation information display image 1301 in FIG. 13A is an example of a GUI image in the case where data processing is performed by using the data stored in the first data storage area 111 in the on-premises 101. A system operation information display image 1302 in FIG. 13B is an example of a GUI image in the case where data processing is performed by using the data stored in the second data storage area 114 in the public cloud 102. For example, the system operation information display images 1301 and 1302 are displayed on the display device 211a.

The system operation information display image 1301 includes a first graph image Gr11, a second graph image Gr12, and a third graph image Gr13. The first graph image Gr11 is an image of a graph representing the number of Worker DB nodes and the number of storage nodes with respect to time. The second graph image Gr12 is an image of a graph representing the CPU utilization rate of the Worker DB cluster with respect to time. The third graph image Gr13 is an image of a graph representing the network transfer amount (NW transfer amount) between the on-premises 101 and the public cloud 102 with respect to time.

The first graph image Gr11 to the third graph image Gr13 indicate that the Worker DB node 106b1 is added at time t1 since the CPU utilization rate of the Worker DB cluster in the on-premises 101 exceeds the threshold value and the on-prem resources are insufficient. Further, the first graph image Gr11 to the third graph image Gr13 indicate that the Worker DB node 106b1 is added (increased) at time t2 since the CPU utilization rate of the Worker DB cluster in the public cloud 102 exceeds the threshold value. Moreover, the first graph image Gr11 to the third graph image Gr13 indicate that the Worker DB cluster is switched to the public cloud Worker DB cluster having caches (that is, the third Worker DB cluster 118) at time t3 since the network transfer amount (the transfer amount of the first network 103) between the on-premises and the public cloud exceeds the threshold value. Furthermore, the first graph image Gr11 to the third graph image Gr13 indicate that the Worker DB node 106b2 is added (increased) at time t4.

The system operation information display image 1302 includes a fourth graph image Gr21, a fifth graph image Gr22, and a sixth graph image Gr23.

The fourth graph image Gr21 to the sixth graph image Gr23 indicate that the Worker DB node 106b1 is added at time t5 since the CPU utilization rate exceeds the threshold value. The fourth graph image Gr21 to the sixth graph image Gr23 indicate that the storage node 112 is added at time t6 since the storage transfer amount in the storage cluster exceeds the threshold value. It should be noted that the threshold value (threshold value storage transfer amount) at this time is changed to a threshold value larger than the current threshold value (see a description St11). The fourth graph image Gr21 to the sixth graph image Gr23 indicate that the Worker DB node 106b2 is added at time t7 since the CPU utilization rate exceeds the threshold value.

<Effect>

As described above, in the data processing infrastructure system 200, when the data processing system 201 executes the cloud bursting at the time of on-prem resource shortage, the Worker DB node 106b having a cache executes the query processing while accessing the storage S1 in the on-premises 101, in parallel with data copy to the storage cluster 113 in the public cloud 102. Accordingly, the data processing infrastructure system 200 can reduce the possibility that the performance of the data processing system 201 is deteriorated due to the waiting time for the data copy. Further, in the data processing infrastructure system 200, in the case where the communication bandwidth of the first network 103 between the on-premises 101 and the public cloud 102 is insufficient (congested), the data processing system 201 reduces the transfer amount of the first network 103 by switching the Worker DB node that performs data processing, to the Worker DB node 106b2 that has a cache and that caches frequently accessed data. Accordingly, even in the case where the communication bandwidth of the first network 103 is insufficient, the data processing infrastructure system 200 can reduce the possibility that the performance of the data processing system 201 is deteriorated or that the data copy speed is decreased.

What is claimed is:

1. A computer system comprising:
   a data processing system that is built in a specific environment,
   the data processing system including
      a management node that accepts data processing,
      a processing cluster that includes a plurality of processing nodes configured to perform, in a distributed manner, the data processing accepted by the management node, and
      a storage that includes a first data storage area in which data necessary for the data processing is stored,
   the data processing system being configured to be capable of executing scaling for increasing or decreasing the number of the processing nodes of the plurality of processing nodes that are resources for executing the data processing in the distributed manner, according to a load of the processing cluster, wherein the data processing system,
- in a case where the resources of the data processing system become insufficient due to an increase in the load of the processing cluster,
- includes the processing nodes of the plurality of processing nodes the number of which can be increased or decreased and a storage cluster having a plurality of storage nodes the number of which can be increased or decreased, the data processing system being configured to be capable of executing scale-out for increasing the number of the processing nodes of the plurality of processing nodes that are the resources for executing the data processing in the distributed manner, in a cloud environment different from the specific environment that can communicate with the data processing system via a network, and the data processing system,
- in a case where the scale-out is executed in the cloud environment,
- starts a data copy process of copying data that is stored in the first data storage area and that is to be used in the data processing, from the first data storage area of the data processing system to a second data storage area of the storage cluster via the network, and
- executes, during a period of time from the start of the data copy process to an end of the data copy process, the scale-out in the cloud environment by increasing the number of the processing nodes of the plurality of processing nodes that execute the data processing in the distributed manner while accessing the data stored in the first data storage area of the storage via the network.

2. The computer system according to claim 1, wherein the specific environment is an on-premises environment, and the cloud environment is a public cloud environment.

3. The computer system according to claim 1, wherein the data processing system, during the period of time from the start of the data copy process to the end of the data copy process,
- first executes the scale-out by increasing the number of the processing nodes of the plurality of processing nodes having no cache, and
- in a case where a communication bandwidth of the network becomes congested after the scale-out due to the data copy process and the access made by the processing nodes of the plurality of processing nodes to the first data storage area via the network,
- switches the processing nodes of the plurality of processing nodes that execute the data processing in the distributed manner while accessing the data stored in the first data storage area via the network from the processing nodes of the plurality of processing nodes having no cache to the processing nodes of the plurality of processing nodes that have caches, that execute the data processing in the distributed manner while accessing the data stored in the first data storage area of the storage via the network, and that cache a part of data transferred from the storage.

4. The computer system according to claim 3, wherein the data processing system, during the period of time from the start of the data copy process to the end of the data copy process, executes the scale-out by using the processing nodes of the plurality of processing nodes having no cache before the processing nodes of the plurality of processing nodes that execute the data processing in the distributed manner are switched from the processing nodes of the plurality of processing nodes having no cache to the processing nodes of the plurality of processing nodes having caches, and executes the scale-out by using the processing nodes of the plurality of processing nodes having caches after the processing nodes of the plurality of processing nodes that execute the data processing in the distributed manner are switched from the processing nodes of the plurality of processing nodes having no cache to the processing nodes of the plurality of processing nodes having caches.

5. The computer system according to claim 1, wherein the data processing system,
- in a case where the data copy process is completed, switches the processing nodes of the plurality of processing nodes that execute the data processing in the distributed manner while accessing the data stored in the first data storage area via the network, to the processing nodes of the plurality of processing nodes that access the data stored in the second data storage area of the storage cluster, and executes the data processing in the distributed manner by the switched processing nodes of the plurality of processing nodes.

6. The computer system according to claim 5, wherein the data processing system,
- in the case where the data copy process is completed, executes the scale-out in the cloud environment by increasing the number of the processing nodes of the plurality of processing nodes that execute the data processing in the distributed manner while accessing the data stored in the second data storage area of the storage cluster, according to the load of the processing cluster.

7. The computer system according to claim 1, wherein the data processing system,
- in a case where the data copy process is completed, switches the processing nodes of the plurality of processing nodes that execute the data processing in the distributed manner while accessing the data stored in the first data storage area via the network, to the processing nodes of the plurality of processing nodes that have no cache and that access the data stored in the second data storage area of the storage cluster, and executes the data processing in the distributed manner by the switched processing nodes of the plurality of processing nodes that have no cache, and the data processing system,
- in a case where the resources of the processing nodes of the plurality of processing nodes that have been subjected to the scale-out in the cloud environment are overloaded and the data communication bandwidth in the storage cluster is congested after the data copy process is completed,
- increases the number of the storage nodes after the processing nodes of the plurality of processing nodes that execute the data processing in the distributed manner while accessing the data stored in the second data storage area are switched to the processing nodes of the plurality of processing nodes that have caches, that execute the data processing in the distributed manner while accessing the data stored in the second data storage area, and that cache a part of data transferred from the second data storage area.

8. The computer system according to claim 5, wherein the data processing system,
in a case where a state in which a load of the resources of the processing nodes of the plurality of processing nodes in the cloud environment is low and in which usage of the data communication bandwidth in the storage cluster is low has continued for a predetermined period of time or more,
executes scale-in for reducing the number of the processing nodes of the plurality of processing nodes in the cloud environment to 0, deletes the data in the storage cluster, and stops the storage cluster.

9. The computer system according to claim 1, further comprising:
a display device connected to the data processing system,
wherein the display device displays a screen including system operation information of the data processing system.

10. A scale-out method of a computer system that is executed by a data processing system built in a specific environment,
the data processing system including
a management node that accepts data processing,
a processing cluster that includes a plurality of processing nodes configured to perform, in the distributed manner, the data processing accepted by the management node, and
a storage that includes a first data storage area in which data necessary for the data processing is stored,
the data processing system being configured to be capable of executing scaling for increasing or decreasing a number of the processing nodes of the plurality of processing nodes that are resources for executing the data processing in the distributed manner, according to a load of the processing cluster, wherein
the data processing system,
in a case where the resources of the data processing system become insufficient due to an increase in the load of the processing cluster,
includes the processing nodes of the plurality of processing nodes the number of which can be increased or decreased and a storage cluster having a plurality of storage nodes the number of which can be increased or decreased, and executes scale-out for increasing the number of the processing nodes of the plurality of processing nodes that are the resources for executing the data processing in the distributed manner, in a cloud environment different from the specific environment that can communicate with the data processing system via a network, and,
in a case where the scale-out is executed in the cloud environment,
starts a data copy process of copying data that is stored in the first data storage area and that is to be used in the data processing, from the first data storage area of the data processing system to a second data storage area of the storage cluster via the network, and
executes, during a period of time from the start of the data copy process to an end of the data copy process, the scale-out in the cloud environment by increasing the number of the processing nodes of the plurality of processing nodes that execute the data processing in the distributed manner while accessing the data stored in the first data storage area of the storage via the network.

* * * * *